(12) United States Patent
Weiser et al.

(10) Patent No.: US 9,195,215 B2
(45) Date of Patent: Nov. 24, 2015

(54) HOLOGRAPHIC MEDIUM HAVING A PROTECTIVE LAYER

(71) Applicant: Bayer Intellectual Property GmbH, Monheim (DE)

(72) Inventors: Marc-Stephan Weiser, Leverkusen (DE); Daniel Hentschel, Köln (DE); Joachim Petzoldt, Monheim (DE); Pantea Nazaran, Köln (DE); Sebastian Dörr, Düsseldorf (DE); Dirk Dijkstra, Köln (DE); Ute Flemm, Solingen (DE); Dennis Hönel, Zülpich-Wichterich (DE); Friedrich-Karl Bruder, Krefeld (DE); Thomas Fäcke, Leverkusen (DE); Thomas Rölle, Leverkusen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 14/359,347

(22) PCT Filed: Nov. 11, 2012

(86) PCT No.: PCT/EP2012/073551
§ 371 (c)(1),
(2) Date: May 20, 2014

(87) PCT Pub. No.: WO2013/079422
PCT Pub. Date: Jun. 6, 2013

(65) Prior Publication Data
US 2014/0295329 A1    Oct. 2, 2014

(30) Foreign Application Priority Data

Nov. 29, 2011   (EP) .................................. 11191190

(51) Int. Cl.
*G03H 1/02* (2006.01)
*G11B 7/2542* (2013.01)

(52) U.S. Cl.
CPC .......... *G03H 1/0256* (2013.01); *G03H 1/0248* (2013.01); *G11B 7/2542* (2013.01); *G03H 2001/0264* (2013.01); *G03H 2250/39* (2013.01); *G03H 2260/12* (2013.01)

(58) Field of Classification Search
CPC .............. G03H 1/0256; G03H 1/0248; G03H 2260/12; G03H 2250/39; G03H 2001/0264; G11B 7/2542
See application file for complete search history.

(56) References Cited

U.S. PATENT DOCUMENTS 3,875,201 A    4/1975   Mayer-Mader et al.
4,528,388 A    7/1985   Arend et al.
(Continued)

FOREIGN PATENT DOCUMENTS

CA    1061043 A1    8/1979
CA    1155581 A1    10/1983
(Continued)

OTHER PUBLICATIONS

International Search Report for PCT/EP2012/073551 mailed Jan. 30, 2013.

*Primary Examiner* — Martin Angebrannt
(74) *Attorney, Agent, or Firm* — Drinker Biddle & Reath LLP

(57) ABSTRACT

This invention relates to a holographic medium comprising a protective layer and a photopolymer film which is bonded to the protective layer and contains polyurethane matrix polymers, acrylate writing monomers and photoinitiators, wherein the protective layer is impermeable to the constituents of the photopolymer film, is optically clear and is transparent to electromagnetic radiation having a wavelength in the range of from 350 to 800 nm. The invention further provides the use of a holographic medium according to the invention in the production of holograms, and a process for the production of a holographic medium according to the invention.

10 Claims, 4 Drawing Sheets

(56) References Cited

U.S. PATENT DOCUMENTS

| | | | |
|---|---|---|---|
| 4,983,003 A * | 1/1991 | Wreede et al. | 359/3 |
| 7,173,744 B1 * | 2/2007 | Whiteside et al. | 359/3 |
| 2002/0120045 A1 | 8/2002 | Musch et al. | |
| 2003/0148192 A1 | 8/2003 | Ashizaki et al. | |
| 2004/0034162 A1 | 2/2004 | Laas et al. | |
| 2005/0085584 A1 | 4/2005 | Musch et al. | |
| 2006/0019172 A1 | 1/2006 | Ohtaki et al. | |
| 2007/0166625 A1 * | 7/2007 | Cole et al. | 430/1 |
| 2008/0304120 A1 * | 12/2008 | Hayashida et al. | 359/3 |
| 2009/0142672 A1 * | 6/2009 | Yamada | 430/2 |
| 2009/0305146 A1 * | 12/2009 | Hayashida et al. | 430/2 |
| 2010/0086860 A1 * | 4/2010 | Roelle et al. | 430/2 |
| 2010/0203241 A1 | 8/2010 | Weiser et al. | |
| 2011/0236803 A1 | 9/2011 | Weiser et al. | |
| 2012/0214089 A1 | 8/2012 | Hönel et al. | |
| 2012/0219883 A1 | 8/2012 | Bruder et al. | |
| 2014/0295329 A1 * | 10/2014 | Weiser et al. | 430/2 |
| 2015/0017353 A1 * | 1/2015 | Weiser et al. | 428/29 |

FOREIGN PATENT DOCUMENTS

| | | |
|---|---|---|
| CA | 2253119 A1 | 5/1999 |
| CN | 101320208 A | 12/2008 |
| DE | 2156453 A1 | 8/1973 |
| DE | 2306610 | 8/1974 |
| DE | 2446440 A1 | 4/1976 |
| DE | 3002734 A1 | 7/1981 |
| DE | 3044811 A1 | 7/1982 |
| EP | 0916647 A2 | 5/1999 |
| EP | 1981027 A2 | 10/2008 |
| EP | 1995648 A2 | 11/2008 |
| EP | 2218743 A1 | 8/2010 |
| EP | 2372454 A1 | 10/2011 |
| WO | WO-00/39181 A1 | 7/2000 |
| WO | WO-01/88006 A1 | 11/2001 |
| WO | WO-02/24825 A1 | 3/2002 |
| WO | WO-2005/035683 A1 | 4/2005 |
| WO | WO-2011/054791 A1 | 5/2011 |
| WO | WO-2011/067057 A1 | 6/2011 |

* cited by examiner

Figure 1:

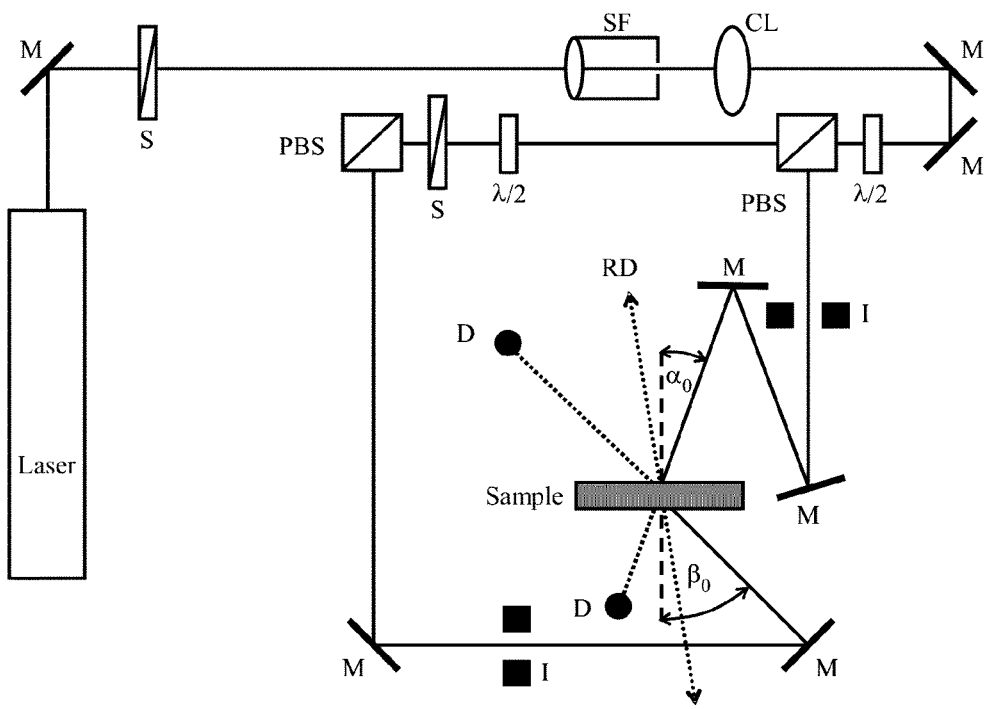

Figure 1 shows the geometry of a holographic media tester (HMT) at $\lambda = 633$ nm (He-Ne laser): M = mirror, S = shutter, SF = spatial filter, CL = collimator lens, $\lambda/2$ = $\lambda/2$ plate, PBS = polarisation-sensitive beam splitter, D = detector, I = iris diaphragm, $\alpha_0 = -21.8°$, $\beta_0 = 41.8°$ are the angles of incidence of the coherent beams measured outside the sample (outside the medium). RD = reference direction of the turntable.

Figure 2:

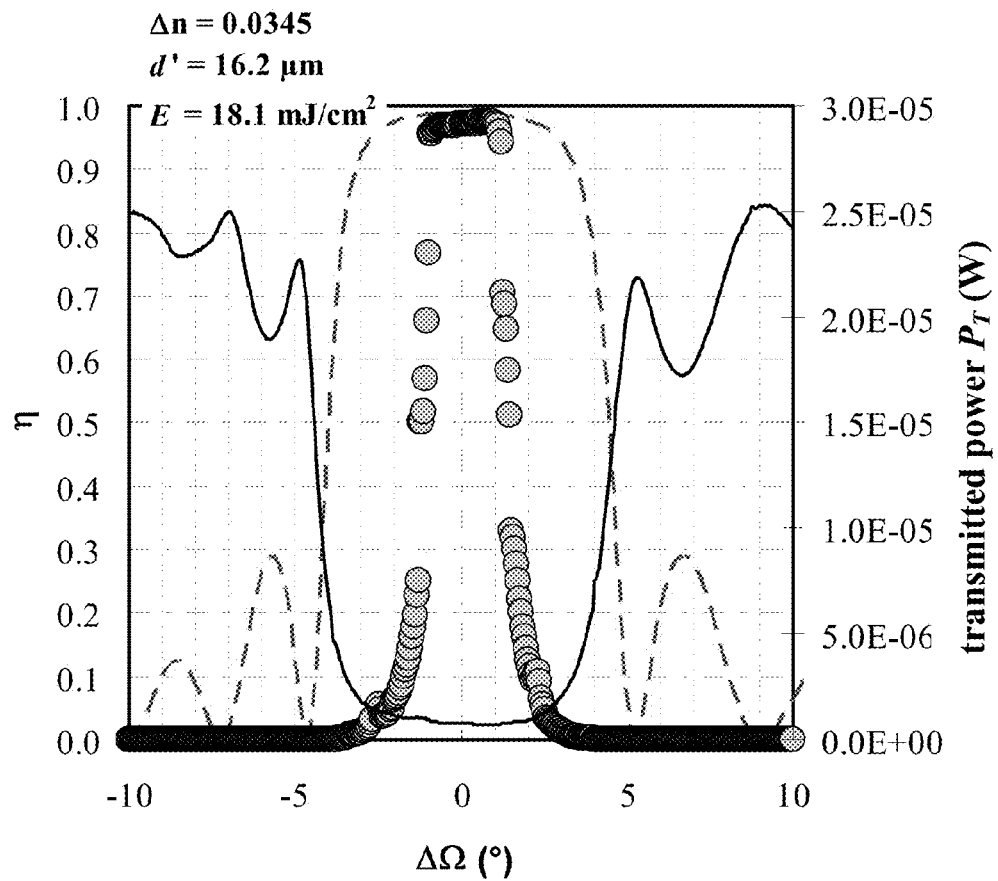

Figure 2 shows the measured transmitted power $P_T$ (right $y$-axis) as a solid line plotted against the angle detuning $\Delta\Omega$, the measured diffraction efficiency $\eta$ (left $y$-axis) as solid circles plotted against the angle detuning $\Delta\Omega$ (in so far as permitted by the finite size of the detector), and the adaptation of the Kogelnik theory as a broken line (left $y$-axis).

HOLOGRAPHIC MEDIUM HAVING A PROTECTIVE LAYER

CROSS-REFERENCE TO RELATED APPLICATIONS

Figure 3:
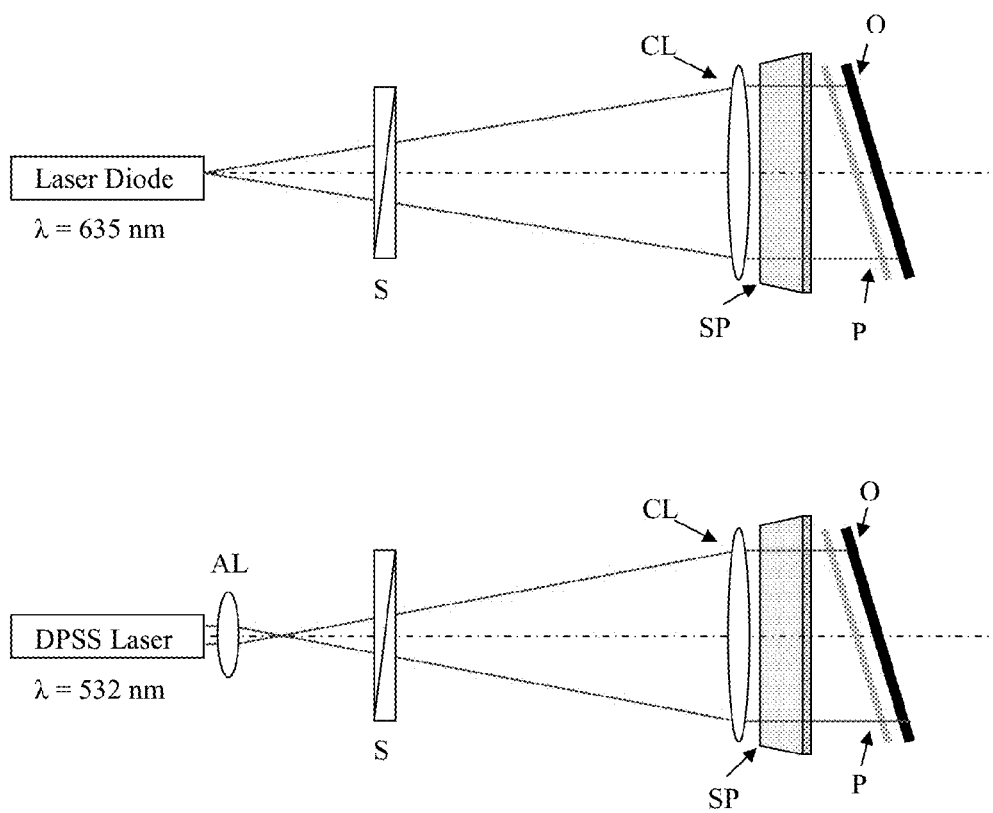
Figure 3 shows the measuring arrangement for testing the holographic properties for wavelengths of 635 and 532 nm.

This application is a national stage application (under 35 U.S.C. §371) of PCT/EP2012/073551, filed Nov. 26, 2012, which claims benefit of European Application No. 11191190.5, filed Nov. 29, 2011, both of which are incorporated herein by reference in their entirety.

This invention relates to a holographic medium comprising a protective layer and a photopolymer film which is bonded to the protective layer and contains polyurethane matrix polymers, acrylate writing monomers and photoinitiators. The invention further provides the use of a holographic medium according to the invention in the production of holograms, and a process for the production of a holographic medium according to the invention.

Holographic media for the recording of volume holograms are described in patent applications EP 2 218 743, EP 2 372 454, WO 2011/054791 and WO 2011/067057. The media of the prior art comprise a photopolymer film which is slightly tacky. In order to avoid the adhesion of dust or other interfering particles, it is therefore necessary to protect the photopolymer film by covering it with a non-transparent laminate film. The tackiness additionally leads to problems in the replication of holograms into the photopolymer films. The photopolymer film must therefore be brought into close contact with a master hologram (normally based on a silver halide emulsion). To that end, the film is laminated either onto a glass support over the master hologram or directly onto the master hologram of the silver halide emulsion. In the case of a tacky photopolymer film, parts thereof can remain adhered to the glass support, which leads to an increased outlay in terms of cleaning and can accordingly have a negative effect on continuous process management. In the worst case, the photopolymer film adheres so strongly to the master hologram itself that the photopolymer film and the master hologram cannot be separated without being damaged. Furthermore, in some replication processes, an immersion fluid must be used to equalise differences in refractive index between the glass and the photopolymer film. In the case of the media known in the prior art, undesirable chemical changes (washing out of the imaging components, swelling, etc.) can thereby occur, which can have a negative effect on the quality of the resulting holograms. In many cases, the holograms obtained after exposure are additionally to be adhesively bonded to substrates. An adhesive or the adhesive side of an adhesive tape is thereby applied directly to the photopolymer film. However, migration phenomena between the photopolymer film and the adhesive can then occur, resulting in colour changes in the hologram. In the case of the photopolymer films described in EP 2 218 743, WO 2011/054791 and WO 2011/067057, such colour changes occur with a large number of different adhesives.

In the prior art, protective layers which are applied to unexposed holographic photopolymers are known in principle, for example, from applications US 2003148192 (A1) and CN 101320208. Owing to the changed chemical structure of the photopolymer used here, the majority of the compositions mentioned therein for protective layers are unsuitable in the present case because, due to haze, chemical reaction with the unexposed photopolymer, incompatibility or poor wettability, they prevent a hologram from being exposed into the photopolymer film.

It was, therefore, an object of the present invention to develop further a holographic medium of the type mentioned at the beginning in such a manner that it is not tacky and is protected from harmful chemical influences, for example by immersion fluids or adhesives. At the same time, the optical properties of the medium are not to be negatively affected, so that holograms can readily be exposed into it.

The object is achieved in a holographic medium of the type mentioned at the beginning in that the protective layer is impermeable to the constituents of the photopolymer film, is optically clear and is transparent to electromagnetic radiation having a wavelength in the range of from 350 to 800 nm.

According to the invention, the polyurethane matrix polymers and acrylate writing monomers described in EP 2 372 454 can particularly preferably be used. Reference is made in this connection in particular to the following sections of EP 2 372 454: polyurethane matrix polymers [0016-0088]; acrylate writing monomers [0089-0096].

According to the invention, there are suitable as photoinitiators in particular the compounds mentioned in paragraphs [0043-0045] of EP 2 218 743 A1.

It is likewise possible for the photopolymer film to comprise further components. It is particularly preferred for the photopolymer film to contain the plasticisers described in paragraph [0097] of EP 2 372 454.

According to a preferred embodiment of the invention, the protective layer can cover at least one surface of the photopolymer film completely.

It is likewise preferred for the protective layer to have a thickness of from 1 to 40 µm, preferably from 3 to 25 µm and most particularly preferably from 5 to 20 µm.

In a further development of the invention, it is provided that the protective layer comprises or consists of polyurethane, polychloroprene and/or acrylate polymers.

In a further embodiment of the invention, the protective layer can comprise or consist of high molecular weight, uncrosslinked polymers or three-dimensional network structures of high network density.

Three-dimensional network structures of high network density are obtainable in particular by reacting components that have number-average equivalent molar masses of <1500 g/mol and particularly preferably of <1200 g/mol.

In the present application, uncrosslinked denotes polymers that consist only of linear polymer chains.

The high molecular weight, uncrosslinked polymers can in particular have a mean molar mass of >7500 g/mol and preferably of >10,000 g/mol.

According to a further preferred embodiment, it is provided that the protective layer is obtainable by applying an aqueous or low-solvent polymer formulation to the photopolymer film.

Further preferred protective layers are based on aqueous dispersions of high molecular weight polyacrylates. The resulting layers are no longer tacky, are mechanically resistant and do not interfere with the replication of holograms into the photopolymer film. After the holograms have been exposed into the media, the media can be adhesively bonded with the aid of acrylate-based adhesives without colour changes in the hologram.

Preferably, polyacrylate dispersions that contain a relatively non-polar comonomer, in particular styrene, can also be used.

Also particularly suitable for the production of protective layers within the scope of the invention are dispersions based on polychloroprene.

Particular preference is given also to protective layers comprising or consisting of polyurethane polymers which are physically drying and can be applied from preferably low-solvent solution or from aqueous phase.

The polyurethane-based protective layers can be produced using 1K (one-component) systems (completely reacted soluble polyurethanes, or polyurethanes available as a dispersion) or as 2K (two-component) systems (mixing of the isocyanate with the isocyanate-reactive component directly before application to the film).

Composition of the 2K Polyurethanes:

2K-based polyurethanes are obtainable by reaction of at least one polyisocyanate component a) and at least one isocyanate-reactive component b).

Polyisocyanate Component a):

The polyisocyanate component a) comprises at least one organic compound which contains at least two NCO groups (polyisocyanate).

There can be used as the polyisocyanate all compounds known per se to the person skilled in the art, or mixtures thereof. These compounds can be aromatic-, araliphatic-, aliphatic- or cycloaliphatic-based. The polyisocyanate component a) can also contain in subordinate amounts monoisocyanates, that is to say organic compounds having an NCO group, and/or polyisocyanates containing unsaturated groups.

Examples of suitable polyisocyanates are butylene diisocyanate, hexamethylene diisocyanate (HDI), 2,2,4-trimethylhexamethylene diisocyanate and its isomers (TMDI), isophorone diisocyanate (IPDI), 1,8-diisocyanato-4-(isocyanatomethyl)-octane, the isomeric bis-(4,4'-isocyanatocyclohexyl)methanes and mixtures thereof of any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-toluene diisocyanate, 1,5-naphthylene diisocyanate, 2,4'- and/or 4,4'-diphenylmethane diisocyanate, triphenylmethane-4,4',4''-triisocyanate, or arbitrary mixtures of the above-mentioned compounds.

Monomeric di- or tri-isocyanates with urethane, urea, carbodiimide, acylurea, isocyanurate, allophanate, biuret, oxadiazinetrione, uretdione and/or iminooxadiazinedione structures can likewise be used.

Preference is given to polyisocyanates based on aliphatic, cycloaliphatic and aromatic di- or tri-isocyanates.

The polyisocyanates are particularly preferably dimerised or oligomerised aliphatic and/or aromatic di- or tri-isocyanates.

Most particularly preferred polyisocyanates are isocyanurates, allophanates, uretdiones and/or iminooxadiazinediones based on TDI, HDI, TMDI or mixtures thereof.

The polyisocyanate component a) can also comprise or consist of NCO-functional prepolymers. The prepolymers can contain urethane, allophanate, biuret and/or amide groups. Such prepolymers are obtainable, for example, by reaction of polyisocyanates a1) with isocyanate-reactive compounds a2).

There are suitable as polyisocyanates a1) all compounds mentioned above under a), or mixtures thereof.

Examples of particularly suitable monomeric di- or tri-isocyanates which can be used as polyisocyanate a1) are butylene diisocyanate, hexamethylene diisocyanate, isophorone diisocyanate, trimethylhexamethylene diisocyanate (TMDI), 1,8-diisocyanato-4-(isocyanatomethyl)-octane, isocyanatomethyl-1,8-octane diisocyanate (TIN), 2,4- and/or 2,6-toluene diisocyanate.

There can be used as isocyanate-reactive compounds a2) OH- and NH-functional compounds.

The isocyanate-reactive component a2) comprises at least one organic compound which contains at least two isocyanate-reactive groups (isocyanate-reactive compound). Within the context of the present invention, hydroxy, amino or thio groups are regarded as being isocyanate-reactive groups.

There can be used as the isocyanate-reactive component all systems that contain on average at least 1.5 and preferably from 2 to 3 isocyanate-reactive groups.

Preference is given to the use of ethanediol, di-, tri-ethylene glycol, 1,4-butanediol, 1,6-hexanediol, 2,2-dimethyl-1,3-propanediol, 1,8-octanediol, trimethylolpropane, pentaerythritol, 3-methylpentanediol, glycerol or mixtures thereof.

Further suitable isocyanate-reactive compounds a2) of relatively high molar mass are, for example, polyester, polyether, polycarbonate, poly(meth)acrylate and/or polyurethane polyols.

It is likewise possible to use amines as isocyanate-reactive compounds a2). Examples of suitable amines are ethylenediamine, diethylenetriamine, triethylenetetramine, propylenediamine, diaminocyclohexane, diaminobenzene, diaminobisphenyl, difunctional polyamines such as, for example, the Jeffamines®, or di-, tri- and higher-functional amine-terminated polymers, or arbitrary mixtures thereof with one another.

When using NCO-functional prepolymers, particular preference is given to the use of urethanes and/or biurets having primary NCO groups based on aliphatic or aromatic polyisocyanates such as HDI and/or TDI.

The prepolymers of the polyisocyanate component a) can in particular have a residual content of free monomeric isocyanate of <1 wt. %, particularly preferably <0.5 wt. % and most particularly preferably <0.2 wt. %.

The polyisocyanate component a) can also comprise mixtures of the above-mentioned polyisocyanates and prepolymers.

It is optionally also possible for the polyisocyanate component a) to contain, wholly or proportionately, polyisocyanates that have been reacted wholly or partially with blocking agents known from coatings technology.

Isocyanate-Reactive Component b):

The isocyanate-reactive component b) comprises at least one organic compound which contains at least two isocyanate-reactive groups (isocyanate-reactive compound). There can be used as isocyanate-reactive compounds OH- and NH-functional compounds as well as SH-functional compounds.

There can be used as the isocyanate-reactive component all systems that contain on average at least 1.5 and preferably from 2 to 3 isocyanate-reactive groups.

Suitable isocyanate-reactive compounds are, for example, polyester, polyether, polycarbonate, poly(meth)acrylate and/or polyurethane polyols as well as amino- or SH-terminated analogues thereof.

Suitable polycarbonate polyols are obtainable in a manner known per se by reaction of organic carbonates or phosgene with diols or diol mixtures.

Organic carbonates suitable for that purpose are, for example, dimethyl, diethyl and diphenyl carbonate.

Suitable polyhydric alcohols include the polyhydric alcohols having an OH functionality 2 mentioned above within the context of the discussion of the isocyanate-reactive component a2). 1,4-Butanediol, 1,6-hexanediol and/or 3-methylpentanediol can preferably be used.

Suitable polyether polyols are polyaddition products, optionally having a block-wise structure, of cyclic ethers on OH- or NH-functional starter molecules. Suitable cyclic ethers are, for example, styrene oxides, ethylene oxide, propylene oxide, tetrahydrofuran, butylene oxide, epichlorohydrin, as well as arbitrary mixtures thereof. There can be used as starter molecules the polyhydric alcohols having an OH functionality ≥2 mentioned above within the context of the discussion of the polyester polyols, as well as primary or secondary amines and amino alcohols.

Preferred polyether polyols are those of the above-mentioned type that are based on propylene oxide, ethylene oxide and/or tetrahydrofuran. Polyether-polyester copolyols having a polyester content of at least 35 wt. % are particularly preferred.

Polyesters having terminal OH or amino groups are preferably used.

Particularly suitable polyester polyols are, for example, linear or branched polyester polyols which are obtainable from aliphatic, cycloaliphatic or aromatic di- or poly-carboxylic acids or their anhydrides by reaction with polyhydric alcohols having an OH functionality ≥2.

Examples of di- and poly-carboxylic acids and anhydrides that are particularly suitable for the preparation of the polyesters are succinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic or trimellitic acid as well as acid anhydrides such as o-phthalic, trimellitic or succinic anhydride or mixtures thereof. Adipic, o-phthalic and isophthalic acid or their corresponding anhydrides are particularly preferably used.

Particularly suitable alcohols for the preparation of the polyesters are, for example, ethanediol, di-, tri-, tetra-ethylene glycol, 1,2-propanediol, di-, tri-, tetra-propylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol, trimethylolpropane, pentaerythritol, glycerol, or mixtures thereof.

There are preferably used 1,2-propylene glycol, 1,4-butanediol, 1,6-hexanediol, diethylene glycol, triethylene glycol, 2,2-dimethyl-1,3-propanediol, trimethylolpropane, pentaerythritol, glycerol, or mixtures thereof.

It is likewise possible for the polyester polyols to be based on homopolymers or mixed polymers of lactones. These can preferably be obtained by addition of lactones or lactone mixtures, such as butyrolactone, ε-caprolactone and/or methyl-ε-caprolactone, to hydroxy-functional compounds such as polyhydric alcohols having an OH functionality ≥2, for example of the type mentioned above.

The polyols used have an OH functionality of preferably from 1.8 to 4.0 and particularly preferably from 2.0 to 3.3.

In addition to the mentioned polyester, polyether, polycarbonate, poly(meth)acrylate and/or polyurethane polyols, aspartates can preferably also be used in the isocyanate-reactive component a2).

These are obtainable from a Michael addition of an at least difunctional amine with acid anhydrides.

Examples of suitable amines are aliphatic, cycloaliphatic and aromatic di-, tri- and higher-functional amines such as ethylenediamine, hexamethylenediamine, 2-methyl-1,5-pentyldiamine, diethylenetriamine, triethylenetetramine, propylenediamine, diaminocyclohexane, bis(4-aminocyclohexyl)-methane and further substituted derivatives thereof, diaminobenzene, diaminobisphenyl and others, as well as di- and higher-functional polyamines, or arbitrary mixtures thereof with one another. 2-Methyl-1,5-pentyldiamine, diaminocyclohexane, bis(4-aminocyclohexyl)-methane and bis(4-amino-3-methyl-cyclohexyl)-methane are preferably used.

Examples of anhydrides which are used are those of all aliphatic, unsaturated acids, preferably dicarboxylic acids. The anhydrides of maleic acid are particularly preferably used.

For processing reasons, it can be expedient to use various auxiliary substances and additives. These can be, for example, additives conventional in the field of surface-coatings technology, such as solvents, plasticisers, flow agents or adhesion promoters. There are preferably used as solvents liquids having good dissolution properties, high volatility and a low boiling temperature. It can also be advantageous to use a plurality of additives of one type at the same time. Of course, it can also be advantageous to use a plurality of additives of a plurality of types. Solvents that are preferably used are ethyl acetate, butyl acetate, toluene, xylene and 1-methoxy-2-propyl acetate.

Composition of the 1K Polyurethanes:

In principle, all known aqueous polyurethane dispersions can be used. Preference is given, however, to anionically hydrophilised and anionically/non-ionically hydrophilised polyurethane dispersions.

Polyurethane dispersions that are particularly preferably to be used are obtainable by A) preparing isocyanate-functional prepolymers from
   A1) organic polyisocyanates
   A2) polymeric polyols having number-average molecular weights of from 400 to 8000 g/mol, preferably from 400 to 6000 g/mol and particularly preferably from 600 to 3000 g/mol, and OH functionalities of from 1.5 to 6, preferably from 1.8 to 3, particularly preferably from 1.9 to 2.1, and
   A3) optionally hydroxy-functional compounds having molecular weights of from 62 to 399 g/mol and
   A4) optionally isocyanate-reactive, anionic or potentially anionic and/or optionally non-ionic hydrophilising agents,
and B) then reacting the free NCO groups thereof wholly or partially
   B1) optionally with amino-functional compounds having molecular weights of from 32 to 400 g/mol and
   B2) with amino-functional, anionic or potentially anionic hydrophilising agents
with chain extension, and dispersing the prepolymers in water before, during or after step B).

Isocyanate-reactive groups are, for example, primary and secondary amino groups, hydroxy groups or thiol groups.

Such aqueous polyurethane dispersions are preferably hydrophilised anionically by means of sulfonate groups and/or carboxylate groups. Particularly preferably, only sulfonate groups are present for the anionic hydrophilisation.

The polyurethane dispersions preferably have solids contents of from 10 to 70 wt. %, particularly preferably from 30 to 70 wt. %, most particularly preferably from 30 to 65 wt. %, based on the polyurethane contained therein.

Suitable polyisocyanates of component A1) are the aliphatic, aromatic or cycloaliphatic polyisocyanates having an NCO functionality of greater than or equal to 2 that are known per se to the person skilled in the art. There are particularly preferably used in A1) hexamethylene diisocyanate, isophorone diisocyanate or the isomeric bis-(4,4'-isocyanato-cyclohexyl)methanes, as well as mixtures of the above-mentioned diisocyanates.

In A2), polymeric polyols having a number-average molecular weight $M_n$ of from 400 to 8000 g/mol, preferably from 400 to 6000 g/mol and particularly preferably from 600 to 3000 g/mol, are used. They preferably have an OH functionality of from 1.5 to 6, particularly preferably from 1.8 to 3, most particularly preferably from 1.9 to 2.1.

Such polymeric polyols are the polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols and polyester polycarbonate polyols that are known per se in polyurethane surface-coatings technology. They can be used in A2) individually or in arbitrary mixtures with one another.

Preferred components in A2) are polytetramethylene glycol polyethers and polycarbonate polyols and mixtures thereof, and polytetramethylene glycol polyethers are particularly preferred.

In A3) there can be used polyols of the mentioned molecular weight range having up to 20 carbon atoms, such as ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, neopentyl glycol, hydroquinone dihydroxyethyl ether, bisphenol A (2,2-bis(4-hydroxyphenyl)propane), hydrogenated bisphenol A (2,2-bis(4-hydroxycyclohexyl) propane), trimethylolpropane, trimethylolethane, glycerol, pentaerythritol, and arbitrary mixtures thereof with one another.

Suitable ionically or potentially ionically hydrophilising compounds corresponding to the definition of component A4) are, for example, mono- and di-hydroxycarboxylic acids, mono- and di-hydroxysulfonic acids and also mono- and di-hydroxyphosphonic acids and their salts, such as dimethylolpropionic acid, dimethylolbutyric acid, hydroxypivalic acid, malic acid, citric acid, glycolic acid, lactic acid, the propoxylated adduct of 2-butenediol and $NaHSO_3$, for example described in DE-A 2 446 440 (pages 5-9, formulae I-III).

Suitable non-ionically hydrophilising compounds of component A4) are, for example, polyoxyalkylene ethers which contain at least one hydroxy, amino or thiol group. Examples are the monohydroxy-functional polyalkylene oxide polyether alcohols containing in the statistical mean from 5 to 70, preferably from 7 to 55, ethylene oxide units per molecule, as are obtainable in a manner known per se by alkoxylation of suitable starter molecules (e.g. in Ullmanns Encyclopadie der technischen Chemie, 4th Edition, Volume 19, Verlag Chemie, Weinheim p. 31-38). They are either pure polyethylene oxide ethers or mixed polyalkylene oxide ethers, wherein they contain at least 30 mol %, preferably at least 40 mol %, ethylene oxide units, based on all the alkylene oxide units present.

As component B1) there can be used organic di- or polyamines, such as, for example, 1,2-ethylenediamine, 1,2- and 1,3-diaminopropane, 1,4-diaminobutane, 1,6-diaminohexane, isophoronediamine, isomer mixture of 2,2,4- and 2,4,4-trimethylhexamethylenediamine, 2-methylpentamethylenediamine, diethylenetriamine, 4,4-diaminodicyclohexylmethane, hydrazine hydrate and/or dimethylethylenediamine. 1,2-Ethylenediamine, bis(4-aminocyclohexyl)methane, 1,4-diaminobutane, isophoronediamine, ethanolamine, diethanolamine and diethylenetriamine are preferably used.

Suitable anionically hydrophilising compounds of component B2) are alkali metal salts of mono- and di-aminosulfonic acids. Examples of such anionic hydrophilising agents are salts of 2-(2-aminoethylamino)ethanesulfonic acid, ethylenediamine-propyl- or -butyl-sulfonic acid, 1,2- or 1,3-propylenediamine-β-ethylsulfonic acid or taurine. The salt of cyclohexyl-aminopropanesulfonic acid (CAPS) from WO-A 01/88006 can further be used as anionic hydrophilising agent.

Particularly preferred anionic hydrophilising agents B2) are those which contain sulfonate groups as ionic groups and two amino groups, such as the salts of 2-(2-aminoethylamino)-ethylsulfonic acid and 1,3-propylenediamine-β-ethylsulfonic acid.

Mixtures of anionic and non-ionic hydrophilising agents can also be used for the hydrophilisation.

All processes known from the prior art can be used to prepare the polyurethane dispersions, such as, for example, the prepolymer mixing process, the acetone process or the melt dispersion process. The procedure is preferably carried out according to the acetone process.

In addition to polyurethane dispersions, solvent-borne 1K PU systems can also be used. Polyurethane solutions which are preferably to be used are obtainable by a prepolymerisation process by preparing isocyanate-functional prepolymers from
A1) organic polyisocyanates,
A2) polymeric polyols having number-average molecular weights of from 400 to 8000 g/mol, preferably from 400 to 6000 g/mol and particularly preferably from 600 to 3000 g/mol, and OH functionalities of from 1.5 to 6, preferably from 1.8 to 3, particularly preferably from 1.9 to 2.1, and
A3) optionally hydroxy-functional compounds having molecular weights of from 62 to 399 g/mol
and
then reacting the free NCO groups of the prepolymers from
A) wholly or partially with
B1) optionally with amino-functional compounds having molecular weights of from 32 to 400 g/mol
with chain extension,
the prepolymers being dissolved in one or more organic solvents before, during or after step B).

The structural units A1), A2), A3) and B1) mentioned for the preparation of the polyurethane solutions correspond to the structural units which are also suitable for the preparation of dispersions.

The processes for the preparation of polyurethane solutions, including the choice of suitable solvents, stirrer vessels and solvents, are known in the prior art.

The polyurethane solutions to be used preferably have solids contents of from 5 to 70 wt. %, particularly preferably from 15 to 60 wt. %, most particularly preferably from 20 to 40 wt. %, based on the total weight of the polyurethane solution.

The polymer dispersions or solutions to be used and the prepared therefrom can additionally also contain auxiliary substances and additives. Examples of such auxiliary substances and additives are crosslinkers, thickeners, cosolvents, thixotropic agents, stabilisers, antioxidants, light stabilisers, plasticisers, pigments, fillers, hydrophobing agents and flow aids.

Composition of Dual Cure Systems

In addition to the above-described polyurethane dispersions and solutions, it is also possible to use polyurethane systems which contain groups that are post-crosslinkable by actinic radiation. Ethylenically unsaturated compounds can preferably be used.

The protective layer can in this case contain a polyurethane polymer which can contain further polymeric units such as, for example, polyurea units, polyester units and the like. The polyurethane polymer can in particular contain (meth)acrylate groups. Within the scope of the present invention, the term (meth)acrylate groups is to be understood as including acrylate groups and/or methacrylate groups. The (meth)acrylate groups can in principle be bonded to the polymer at any desired position of the polyurethane polymer or of the further units. For example, they can be part of a polyether or polyester (meth)acrylate polymer unit.

The polyurethane containing (meth)acrylate groups can be in the form of an aqueous dispersion and can also be used as such. Aqueous dispersions offer the advantage that even particularly high molecular weight polyurethanes can be processed in a coating composition with low dynamic viscosity, because in dispersions the viscosity is independent of the molecular weight of the constituents of the disperse phase.

Suitable dispersions are, for example, polyurethane dispersions containing (meth)acrylate groups alone or in a mixture with low molecular weight compounds containing (meth)acrylate groups and/or with dispersed polymers without acrylate or methacrylate groups.

It is provided according to the invention that the polyurethane polymer containing (meth)acrylate groups is obtainable from the reaction of a reaction mixture comprising:
(1) polyisocyanates and
(m1) compounds that contain (meth)acrylate groups and are reactive towards isocyanates.

Suitable polyisocyanates (1), which are also to be understood as including diisocyanates, are aromatic, araliphatic, aliphatic or cycloaliphatic polyisocyanates. Mixtures of such di- or poly-isocyanates can also be used. Examples of suitable polyisocyanates are butylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclo-hexyl)methanes or mixtures thereof of any desired isomer content, isocyanatomethyl-1,8-octane diisocyanate, 1,4-cyclohexylene diisocyanate, 1,4-phenylene diisocyanate, 2,4- and/or 2,6-toluene diisocyanate, the isomeric xylene diisocyanates, 1,5-naphthylene diisocyanate, 2,4'- or 4,4'-diphenylmethane diisocyanate, triphenylmethane-4,4',4''-triisocyanate or derivatives thereof having a urethane, isocyanurate, allophanate, biuret, oxadiazinetrione, uretdione, iminooxadiazinedione structure, and mixtures thereof. Preference is given to di- or poly-isocyanates having a cycloaliphatic or aromatic structure because a high proportion of such structural elements has a positive effect on the drying properties, in particular the block resistance, of the coating prior to UV curing. Particularly preferred diisocyanates are isophorone diisocyanate and the isomeric bis(4,4'-isocyanatocyclohexyl)methanes and mixtures thereof.

Component (m1) preferably comprises hydroxy-functional acrylates or methacrylates. Examples are 2-hydroxyethyl(meth)acrylate, polyethylene oxide mono(meth)acrylates, polypropylene oxide mono(meth)acrylates, polyalkylene oxide mono(meth)acrylates, poly($\epsilon$-caprolactone)mono(meth)acrylates, such as Pemcure® 12A (Cognis, Düsseldorf, DE), 2-hydroxypropyl(meth)acrylate, 4-hydroxybutyl(meth)acrylate, 3-hydroxy-2,2-dimethyl-propyl(meth)acrylate, the acrylic acid and/or methacrylic acid partial esters of polyhydric alcohols such as trimethylolpropane, glycerol, pentaerythritol, dipentaerythritol, sorbitol, ethoxylated, propoxylated or alkoxylated trimethylolpropane, glycerol, pentaerythritol, dipentaerythritol, or commercial mixtures thereof. Preference is given to the acrylated monoalcohols. Also suitable are alcohols which can be obtained from the reaction of double-bond-containing acids with optionally double-bond-containing, monomeric epoxide compounds, for example the reaction products of (meth)acrylic acid with glycidyl(meth)acrylate or with the glycidyl ester of versatic acid.

There can further be used isocyanate-reactive oligomeric or polymeric compounds containing unsaturated (meth)acrylate groups, alone or in combination with the above-mentioned monomeric compounds. There are preferably used as component (m1) hydroxyl-group-containing polyester acrylates having an OH content of from 30 mg KOH/g to ≤300 mg KOH/g, preferably from ≥60 mg KOH/g to ≤200 mg KOH/g, particularly preferably from ≥70 mg KOH/g to ≤120 mg KOH/g.

A total of 7 groups of monomer constituents can be used in the preparation of the hydroxy-functional polyester acrylates:
1. (Cyclo)alkanediols such as dihydric alcohols having (cyclo)aliphatically bonded hydroxyl groups of the molecular weight range from ≥62 g/mol to ≤286 g/mol, for example ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, such as, for example, diethylene glycol, triethylene glycol, tetraethylene glycol, dipropylene glycol, tripropylene glycol, polyethylene, polypropylene or polybutylene glycols having a molecular weight of from ≥200 g/mol to ≤4000 g/mol, preferably from ≥300 g/mol to ≤2000 g/mol, particularly preferably from ≥450 g/mol to ≤1200 g/mol. Reaction products of the above-mentioned diols with $\epsilon$-caprolactone or other lactones can likewise be used as diols.
2. Tri- and higher-hydric alcohols of the molecular weight range from ≥92 g/mol to ≤254 g/mol, such as, for example, glycerol, trimethylolpropane, pentaerythritol, dipentaerythritol and sorbitol, or polyethers started on such alcohols, such as, for example, the reaction product of 1 mol of trimethylolpropane with 4 mol of ethylene oxide.
3. Monoalcohols such as, for example, ethanol, 1- and 2-propanol, 1- and 2-butanol, 1-hexanol, 2-ethylhexanol, cyclohexanol and benzyl alcohol.
4. Dicarboxylic acids of the molecular weight range from ≥104 g/mol to ≤600 g/mol and/or their anhydrides, such as, for example, phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid, hydrogenated dimer fatty acids.
5. Higher functional carboxylic acids or their anhydrides, such as, for example, trimellitic acid and trimellitic anhydride.
6. Monocarboxylic acids, such as, for example, benzoic acid, cyclohexanecarboxylic acid, 2-ethylhexanoic acid, caproic acid, caprylic acid, capric acid, lauric acid, natural and synthetic fatty acids.
7. Acrylic acid, methacrylic acid or dimeric acrylic acid.

Suitable hydroxyl-group-containing polyester acrylates include the reaction product of at least one constituent from group 1 or 2 with at least one constituent from group 4 or 5 and at least one constituent from group 7.

Groups having a dispersing action can optionally also be incorporated into the polyester acrylates. Thus, polyethylene glycols and/or methoxypolyethylene glycols can be used proportionately as the alcohol component. Compounds which may be mentioned are, for example, alcohol-started polyethylene glycols, polypropylene glycols and block copolymers thereof as well as the monomethyl ethers of those polyglycols. Polyethylene glycol 1500 and/or polyethylene glycol 500 monomethyl ether is particularly suitable.

It is further possible after the esterification to react a portion of the carboxyl groups, in particular those of the (meth)

acrylic acid, with mono-, di- or poly-epoxides. Preference is given, for example, to the epoxides (glycidyl ethers) of monomeric, oligomeric or polymeric bisphenol A, bisphenol F, hexanediol, butanediol and/or trimethylolpropane or the ethoxylated and/or propoxylated derivatives thereof. This reaction can be used in particular to increase the OH number of the polyester (meth)acrylate because an OH group is formed in the epoxide-acid reaction in each case. The acid number of the resulting product is from ≥0 mg KOH/g to ≤20 mg KOH/g, preferably from ≥0.5 mg KOH/g to ≤10 mg KOH/g and particularly preferably from ≥1 mg KOH/g to ≤3 mg KOH/g. The reaction is preferably catalysed by catalysts such as triphenylphosphine, thiodiglycol, ammonium and/or phosphonium halides and/or zirconium or tin compounds, such as tin(II)ethylhexanoate.

Likewise preferred as component (m1) are hydroxyl-group-containing epoxy(meth)acrylates having OH contents of from ≥20 mg KOH/g to ≤300 mg KOH/g, preferably from ≥100 mg KOH/g to ≤280 mg KOH/g, particularly preferably from ≥150 mg KOH/g to ≤250 mg KOH/g, or hydroxyl-group-containing polyurethane(meth)acrylates having OH contents of from ≥20 mg KOH/g to ≤300 mg KOH/g, preferably from ≥40 mg KOH/g to ≤150 mg KOH/g, particularly preferably from ≥50 mg KOH/g to ≤100 mg KOH/g, as well as mixtures thereof with one another and mixtures with hydroxyl-group-containing unsaturated polyesters as well as mixtures with polyester (meth)acrylates or mixtures of hydroxyl-group-containing unsaturated polyesters with polyester (meth)acrylates. Hydroxyl-group-containing epoxy (meth)acrylates are based in particular on reaction products of acrylic acid and/or methacrylic acid with epoxides (glycidyl compounds) of monomeric, oligomeric or polymeric bisphenol A, bisphenol F, hexanediol and/or butanediol or ethoxylated and/or propoxylated derivatives thereof.

The coating can contain inorganic nanoparticles. Suitable nanoparticles are inorganic oxides, mixed oxides, hydroxides, sulfates, carbonates, carbides, borides and nitrides of elements of main groups II to IV and/or elements of subgroups I to VIII of the periodic system including the lanthanides. Preferred particles are those of silicon oxide, aluminium oxide, cerium oxide, zirconium oxide, niobium oxide and titanium oxide, with silicon oxide nanoparticles being particularly preferred.

The particles used have mean particle sizes of from ≥1 nm to ≤200 nm, preferably from ≥3 nm to ≤50 nm, particularly preferably from ≥5 nm to ≤7 nm. The mean particle size can preferably be determined as the Z-average by means of dynamic light scattering in dispersion. Below a particle size of 1 nm, the nanoparticles reach the size of the polymer particles. Such small nanoparticles can then lead to an increase in the viscosity of the coating, which is disadvantageous. Above a particle size of 200 nm, the particles can in some cases be perceived with the naked eye, which is undesirable.

Preferably ≥75%, particularly preferably ≥90%, most particularly preferably ≥95% of all the particles used have the sizes defined above. As the coarse fraction in the totality of the particles increases, the optical properties of the coating become poorer, in particular haze can occur.

The particles can be so chosen that the refractive index of their material corresponds to the refractive index of the cured radiation-curable coating. The coating then has transparent optical properties. A refractive index in the range of from ≥1.35 to ≤1.45, for example, is advantageous.

The non-volatile components of the radiation-curable layer can account, for example, for the following proportions. The nanoparticles can be present in amounts of from ≥1 wt. % to ≤60 wt. %, preferably from ≥5 wt. % to ≤50 wt. % and in particular from ≥10 wt. % to ≤40 wt. %. Further compounds such as, for example, monomeric crosslinkers can be present in an amount of from ≥0 wt. % to ≤40 wt. % and in particular from ≥15 wt. % to ≤20 wt. %. The polyurethane polymer can then make up the difference to 100 wt. %. In general, the sum of the individual amounts by weight is ≤100 wt. %.

In a further embodiment, the weight average Mw of the polyurethane polymer is in a range of from ≥250,000 g/mol to ≤350,000 g/mol. The molecular weight can be determined by means of gel permeation chromatography (GPC).

In a further embodiment, the reaction mixture further comprises the following components:
(m2) compounds having a hydrophilising action containing ionic groups and/or groups which can be converted into ionic groups and/or non-ionic groups,
(m3) polyol compounds having a mean molecular weight of from ≥50 g/mol to ≤500 g/mol and a hydroxyl functionality of ≥2, and
(m4) amino-functional compounds.

Component (m2) comprises ionic groups, which can be either cationic or anionic in nature, and/or non-ionic hydrophilic groups. Compounds having an anionically or non-ionically dispersing action are those which contain, for example, sulfonium, ammonium, phosphonium, carboxylate, sulfonate, phosphonate groups or groups which can be converted by salt formation into the above-mentioned groups (potentially ionic groups) or polyether groups and can be incorporated into the macromolecules by isocyanate-reactive groups that are present. Isocyanate-reactive groups that are preferably suitable are hydroxyl and amine groups.

Suitable ionic or potentially ionic compounds (m2) are, for example, mono- and di-hydroxycarboxylic acids, mono- and di-aminocarboxylic acids, mono- and di-hydroxysulfonic acids, mono- and di-aminosulfonic acids as well as mono- and di-hydroxyphosphonic acids or mono- and di-aminophosphonic acids and their salts, such as dimethylolpropionic acid, dimethylolbutyric acid, hydroxypivalic acid, N-(2-aminoethyl)-β-alanine, 2-(2-aminoethyl-amino)-ethanesulfonic acid, ethylenediamine-propyl- or -butyl-sulfonic acid, 1,2- or 1,3-propylenediamine-β-ethylsulfonic acid, malic acid, citric acid, glycolic acid, lactic acid, glycine, alanine, taurine, N-cyclohexylaminopropiosulfonic acid, lysine, 3,5-diaminobenzoic acid, addition products of IPDI and acrylic acid and its alkali and/or ammonium salts; the adduct of sodium bisulfite with butene-2-diol-1,4, polyethersulfonate, the propoxylated adduct of 2-butenediol and $NaHSO_3$, as well as structural units which can be converted into cationic groups, such as N-methyl-diethanolamine as hydrophilic structural components. Preferred ionic or potentially ionic compounds are those which have carboxy or carboxylate and/or sulfonate groups and/or ammonium groups. Particularly preferred ionic compounds are those which contain carboxyl and/or sulfonate groups as ionic or potentially ionic groups, such as the salts of N-(2-aminoethyl)-β-alanine, of 2-(2-amino-ethylamino)-ethanesulfonic acid or of the addition product of IPDI and acrylic acid (EP-A 0 916 647, Example 1) as well as of dimethylolpropionic acid.

Suitable compounds having a non-ionically hydrophilising action are, for example, polyoxyalkylene ethers which contain at least one hydroxy or amino group. Such polyethers contain an amount of from ≥30 wt. % to ≤100 wt. % of structural units derived from ethylene oxide. There are suitable polyethers with a linear structure and having a functionality of from ≥1 to ≤3, but also compounds of the general formula (I)

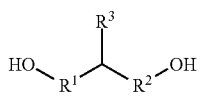

(I)

in which

R¹ and R² independently of one another each denotes a divalent aliphatic, cycloaliphatic or aromatic radical having from 1 to 18 carbon atoms which can be interrupted by oxygen and/or nitrogen atoms, and R³ represents an alkoxy-terminated polyethylene oxide radical.

Compounds having a non-ionically hydrophilising action are, for example, also monohydric polyalkylene oxide polyether alcohols having in the statistical mean from ≥5 to ≤70, preferably from ≥7 to ≤55 ethylene oxide units per molecule, as are obtainable by alkoxylation of suitable starter molecules.

Suitable starter molecules are, for example, saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclo-hexane, 3-ethyl-3-hydroxymethyloxetan or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleic alcohol, aromatic alcohols such as phenol, the isomeric cresols or methoxyphenols, araliphatic alcohols such as benzyl alcohol, anisic alcohol or cinnamic alcohol, secondary monoamines such as dimethylamine, diethylamine, dipropylamine, diisopropylamine, dibutylamine, bis-(2-ethylhexyl)-amine, N-methyl- and N-ethyl-cyclohexylamine or dicyclohexylamine, as well as heterocyclic secondary amines such as morpholine, pyrrolidine, piperidine or 1H-pyrazole. Preferred starter molecules are saturated monoalcohols. Diethylene glycol monobutyl ether is particularly preferably used as the starter molecule.

Alkylene oxides suitable for the alkoxylation reaction are in particular ethylene oxide and propylene oxide, which can be used in the alkoxylation reaction in any desired sequence or in a mixture.

The polyalkylene oxide polyether alcohols are either pure polyethylene oxide polyethers or mixed polyalkylene oxide polyethers, the alkylene oxide units of which comprise ≥30 mol %, preferably ≥40 mol %, ethylene oxide units. Preferred non-ionic compounds are monofunctional mixed polyalkylene oxide polyethers which contain ≥40 mol % ethylene oxide units and ≤60 mol % propylene oxide units.

Component (m2) preferably comprises ionic hydrophilising agents, because non-ionic hydrophilising agents can tend to have a negative effect on the drying properties and in particular the block resistance before the UV curing.

Suitable low molecular weight polyols (m3) are short-chained aliphatic, araliphatic or cycloaliphatic diols or triols containing preferably from ≥2 to ≤20 carbon atoms. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, position-isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxy-cyclohexyl)propane), 2,2-dimethyl-3-hydroxypropionic acid (2,2-dimethyl-3-hydroxypropyl ester). 1,4-Butanediol, 1,4-cyclohexanedimethanol and 1,6-hexanediol are preferred. Examples of suitable triols are trimethylolethane, trimethylolpropane or glycerol, with trimethylolpropane being preferred.

Component (m4) can be selected from the group of the polyamines (which are also to be understood as including diamines), which are used to increase the molar mass and are preferably added towards the end of the polyaddition reaction. This reaction preferably takes place in aqueous medium. The polyamines should thus be more reactive than water towards the isocyanate groups of component (a). Examples which may be mentioned include ethylenediamine, 1,3-propylenediamine, 1,6-hexamethylenediamine, isophoronediamine, 1,3-, 1,4-phenylenediamine, 4,4'-diphenylmethanediamine, amino-functional polyethylene oxides or polypropylene oxides, which are obtainable under the name Jeffamin®, D series (Huntsman Corp. Europe, Belgium), diethylenetriamine, triethylenetetramine and hydrazine. Isophoronediamine, ethylenediamine, 1,6-hexamethylenediamine are preferred. Ethylenediamine is particularly preferred.

The proportionate addition of monoamines, such as, for example, butylamine, ethylamine and amines of the Jeffamin® M series (Huntsman Corp. Europe, Belgium), amino-functional polyethylene oxides and polypropylene oxides, is also possible.

In a further embodiment, the reaction mixture further comprises the following component:
(m5) polyol compounds having a mean molecular weight of from ≥500 g/mol to ≤13,000 g/mol and a mean hydroxyl functionality of from ≥1.5 to ≤5.

Suitable higher molecular weight polyols (m5) are polyols (which are also to be understood as including diols) having a number-average molecular weight in the range of from ≥500 g/mol to ≤13,000 g/mol, preferably from ≥700 g/mol to ≤4000 g/mol. Polymers having a mean hydroxyl functionality of from ≥1.5 to ≤2.5, preferably from ≥1.8 to ≤2.2, particularly preferably from ≥1.9 to ≤2.1, are preferred. These include, for example, polyester alcohols based on aliphatic, cycloaliphatic and/or aromatic di-, tri- and/or poly-carboxylic acids with diols, triols and/or polyols as well as polyester alcohols based on lactones. Preferred polyester alcohols are, for example, reaction products of adipic acid with hexanediol, butanediol or neopentyl glycol or mixtures of the mentioned diols having a molecular weight of from ≥500 g/mol to ≤4000 g/mol, particularly preferably from ≥800 g/mol to ≤2500 g/mol. Likewise suitable are polyetherols, which are obtainable by polymerisation of cyclic ethers or by reaction of alkylene oxides with a starter molecule. Examples which may be mentioned include the polyethylene and/or polypropylene glycols having a mean molecular weight of from ≥500 g/mol to ≤13,000 g/mol, further polytetrahydrofurans having a mean molecular weight of from ≥500 g/mol to ≤8000 g/mol, preferably from ≥800 g/mol to ≤3000 g/mol.

Likewise suitable are hydroxyl-terminated polycarbonates, which are obtainable by reaction of diols or lactone-modified diols or bisphenols, such as, for example, bisphenol A, with phosgene or carbonic acid diesters such as diphenyl carbonate or dimethyl carbonate. Examples which may be mentioned include the polymeric carbonates of 1,6-hexanediol having a mean molecular weight of from ≥500 g/mol to ≤8000 g/mol, as well as the carbonates of reaction products of 1,6-hexanediol with ε-caprolactone in a molar ratio of from ≥0.1 to ≤1. Preference is given to the above-mentioned polycarbonate diols having a mean molecular weight of from ≥800 g/mol to ≤3000 g/mol based on 1,6-hexanediol and/or carbonates of reaction products of 1,6-hexanediol with ε-caprolactone in a molar ratio of from ≥0.33 to ≤1. Hydroxyl-terminated polyamide alcohols and hydroxyl-terminated polyacrylate diols can likewise be used.

In a further embodiment, the number of hydroxyl groups in component (m3) in the reaction mixture has a proportion of the total amount of hydroxyl groups and amino groups of from ≥5 mol % to ≤25 mol %, the hydroxyl groups of water in the reaction mixture not being taken into account. This proportion can also lie within a range of from ≥10 mol % to ≤20 mol % or from ≥14 mol % to ≤18 mol %. This is to be understood as meaning that the number of OH groups in component (m3) is within the mentioned ranges in the totality of the OH- and $NH_2$-group-carrying compounds, that is to say in the totality of components (m1), (m2), (m3) and (m4) and, if (m5) is also present, in the totality of components (m1), (m2), (m3), (m4) and (m5). Water is not taken into account in the calculation. The degree of branching of the polymer can be influenced by the proportion of component (m3), a relatively high degree of branching being advantageous. The drying behaviour can thereby be improved.

In a further embodiment, the reaction mixture further comprises the following component:
(m6) compounds that contain (meth)acrylate groups and that are not reactive and/or have not been made to react with isocyanates. They are preferably used in amounts of from ≥1 wt. % to ≤35 wt. %, in particular from ≥5 wt. % to ≤25 wt. % and most particularly preferably from ≥10 wt. % to ≤20 wt. % of the total solids content of the reaction mixture.

The reaction mixture can further contain additives and/or auxiliary substances and/or solvents conventional in the technology of surface coatings, inks and printing inks. Examples thereof are in particular photoinitiators, light stabilisers, flow and wetting additives.

Composition of the Polyacrylate Dispersions:

In addition to the polyurethane dispersions mentioned above, polyacrylate dispersions are also used. The acrylate polymer preferably has a weight-average molecular weight Mw in the range of from $10^3$ to $10^6$ g/mol, particularly preferably in the range of from $10^4$ to $5*10^5$ g/mol.

The acrylate polymer in the dispersion preferably has a mean particle diameter in the range of from 40 to 200 nm, most particularly preferably in the range of from 80 to 160 nm. The particle diameter is determined by means of laser correlation spectroscopy (instrument: Malvern Zetasizer 1000, Malvern Instruments LTD), the Z-averages are stated.

The solids content of the polyacrylate dispersions is from 25 to 65 wt. %, preferably from 30 to 55 wt. %, most particularly preferably from 33 to 45 wt. %. The solids content of a dispersion is generally determined by the ratio of water to organic starting materials.

The pH value of the polyacrylate dispersions can be varied by adding defined amounts of a base and can be from pH 3 to 12, a pH value of from 6 to 9 being preferred. In most cases, the polymerisation takes place in an acidic pH range and the neutralisation takes place after the polymerisation is complete. It is, however, also possible to add a portion of the base in the course of the polymerisation in order to prevent any agglomeration. There can be used as bases the inorganic or organic bases known to the person skilled in the art. These include, for example, aqueous solutions of alkali hydroxides, ammonium hydroxide, organic amines such as triethylamine or ethyldiisopropylamine. Alkali hydroxides and ammonium hydroxide are preferred.

The polyacrylate dispersions of the present invention that are used can contain:

aa) C1-C20-alkyl acrylates,
ba) C1-C20-alkyl methacrylates,
ca) acid-functional, olefinically unsaturated monomers,
da) optionally styrene and/or other vinyl aromatic compounds having up to 20 carbon atoms, and
ea) optionally hydroxy-functional monomers.

The sum of the amounts by weight of components aa), ba), ca), da) and ea) is preferably 100%.

Suitable esters of acrylic acid aa) include in particular methyl acrylate, ethyl acrylate, propyl acrylate, isopropyl acrylate, n-butyl acrylate, sec-butyl acrylate, tert-butyl acrylate, pentyl acrylate, hexyl acrylate, heptyl acrylate, octyl acrylate, 2-octyl acrylate, ethylhexyl acrylate, nonyl acrylate, 2-methyloctyl acrylate, 2-tert-butylheptyl acrylate, 3-isopropylheptyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate, hexadecyl acrylate, 2-methylhexadecyl acrylate, heptadecyl acrylate, 5-isopropylheptadecyl acrylate, 5-ethyloctadecyl acrylate, octadecyl acrylate, nonadecyl acrylate, eicosyl acrylate, cycloalkyl acrylates such as, for example, cyclopentyl acrylate, cyclohexyl acrylate, 3-vinyl-2-butylcyclohexyl acrylate, cycloheptyl acrylate, cyclooctyl acrylate, bornyl acrylate, tetrahydrofurfuryl acrylate and isobornyl acrylate. Furthermore, the acrylic acid derivatives can also be used in the form of the corresponding nitriles or amides, such as, for example, acrylonitrile or acrylamide. In addition, it is possible to use other functional monomers, depending on the desired application, such as, for example, diacetoneacrylamide or acetoacetoxyethyl acrylate. Ethyl acrylate, n-butyl acrylate, ethylhexyl acrylate, cyclohexyl acrylate, acrylamide or acrylonitrile are preferred, and ethyl acrylate, n-butyl acrylate or ethylhexyl acrylate are particularly preferred.

Suitable esters of methacrylic acid ba) include in particular methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, ethylhexyl methacrylate, nonyl methacrylate, 2-methyloctyl methacrylate, 2-tert-butylheptyl methacrylate, 3-isopropylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-isopropylheptadecyl methacrylate, 5-ethyloctadecyl methacrylate, octadecyl methacrylate, nonadecyl methacrylate, eicosyl methacrylate, cycloalkyl methacrylates such as, for example, cyclopentyl methacrylate, cyclohexyl methacrylate, 3-vinyl-2-butylcyclohexyl methacrylate, cycloheptyl methacrylate, cyclooctyl methacrylate, bornyl methacrylate, tetrahydrofurfuryl methacrylate and isobornyl methacrylate. Furthermore, the methacrylic acid derivatives can also be used in the form of the corresponding nitriles or amides, such as, for example, methacrylonitrile or methacrylamide. In addition, it is possible to use other functional monomers, depending on the desired application, such as, for example, diacetone-methacrylamide or acetoacetoxyethyl methacrylate and 2-(perfluorohexyl) ethyl methacrylate. Methyl methacrylate, ethyl methacrylate, butyl methacrylate, tert-butyl methacrylate, methacrylamide or methacrylonitrile are preferred, and methyl methacrylate, tert-butyl methacrylate or butyl methacrylate are particularly preferred.

Suitable olefinically unsaturated, acid-functional monomers ca) are sulfone-, phosphate- or carboxylic-acid-functional monomers, preference being given to unsaturated carboxylic-acid-functional monomers such as acrylic acid, methacrylic acid, β-carboxyethyl acrylate, crotonic acid, fumaric acid, maleic anhydride, itaconic acid or monoalkyl esters of dibasic acids or anhydrides, such as, for example, maleic acid monoalkyl esters. Further suitable as compounds of component c) are also unsaturated, radically polymerisable compounds having phosphate or phosphonate or sulfonic acid or sulfonate groups, as are described, for example, in WO-A 00/39181 (p. 8, l.13-p. 9, l.19). Acrylic acid or methacrylic acid is particularly preferred, and acrylic acid is most particularly preferred.

Suitable vinyl aromatic compounds da) are, for example, vinyltoluene, o- and p-methyl-styrene, butylstyrene, 4-n-butylstyrene, 4-n-decylstyrene, halogenated styrenes, such as, for example, monochlorostyrenes, dichlorostyrenes, tribromostyrenes or tetrabromostyrenes. Styrene is preferred.

Hydroxy-functional monomers ea) can optionally also be used. Suitable methacrylate compounds are those which carry a hydroxy function. These include, for example, hydroxyethyl methacrylate, hydroxypropyl methacrylate or hydroxybutyl methacrylate. Suitable compounds e) are also acrylate compounds which carry a hydroxy function. These include, for example, hydroxyethyl acrylate, hydroxypropyl acrylate or hydroxybutyl acrylate.

Particular preference is given to the use of dispersions which, as well as containing various (meth)acrylates (component aa) and/or ba) and/or ea)), contain non-polar comonomers, preferably styrene and/or other vinyl aromatic compounds (component da)), in particular styrene, or special hydrophobic (meth)acrylates such as those having fluorinated side chains.

Preferred styrene contents are in the range of from 20 to 80 wt. %, particularly preferably from 40 to 70 wt. %.

Preferred contents of partially fluorinated comonomers are in the range of from 0.1 to 8 wt. %, particularly preferably from 0.2 to 3 wt. %.

The preparation of the polyacrylate dispersion can be carried out in a manner known per se, for example by means of emulsion polymerisation. Advantageously, it is carried out by a fed-batch process, in which water, emulsifier and optionally a small amount of initiator are first placed in a reaction vessel. The initial charge thereby contains preferably from 40 to 80 parts by weight of water, based on the total amount of water, from 0.1 to 1.5 parts by weight of emulsifier, based on the solid, and optionally from 0.01 to 0.3 wt. % of initiator, based on the solid, the sum of the indicated parts by weight being 100.00 parts by weight. There then follows the metered addition of a small amount of the monomers, preferably from 5 to 15 wt. %, optionally with the simultaneous metered addition of the initiator, preferably from 0.01 to 0.3 wt. %, to form an internal seed on which the further polymerisation steps take place.

The monomers are then added continuously to that internal seed in the mentioned proportions and are polymerised to a conversion of at least 95.0 wt. %, preferably at least 98.0 wt. %, particularly preferably at least 99.0 wt. %, most particularly preferably at least 99.5 wt. %, in each case based on their total weight. The emulsion polymerisation generally takes place at a temperature of from 30 to 100° C., preferably from 50 to 90° C.

Stabilisation of the dispersions which contain an acrylate polymer is carried out inter alia by means of ionic and/or non-ionic emulsifiers and/or protective colloids. There are suitable as ionic emulsifiers primarily anionic emulsifiers. They can be the alkali or ammonium salts of alkyl, aryl or alkylaryl sulfonates, phosphates, phosphonates or compounds with other anionic end groups, it also being possible for oligo- or poly-ethylene oxide units to be located between the hydrocarbon radical and the anionic group. Typical examples are sodium lauryl sulfate, sodium lauryl diglycol sulfate, sodium decyl glycol ether sulfate, sodium octylphenol glycol ether sulfate or sodium dodecylbenzene sulfate.

There are conventionally used as non-ionic emulsifiers alkyl polyglycol ethers, such as ethoxylation products of lauryl, oleyl or stearyl alcohol or of mixtures such as coconut fatty alcohol. Likewise suitable are alkylphenol polyglycol ethers, such as ethoxylation products of octyl- or nonyl-phenol, diisopropylphenol, triisopropylphenol, di- or tri-tert-butylphenol. In addition to the mentioned compound classes, ethoxylation products of propylene oxide can also be used.

There are used as suitable protective colloids natural substances such as gum arabic, starch, alginates, or modified natural substances such as methyl-, ethyl-, hydroxyalkyl- or carboxymethyl-cellulose, or synthetic substances, such as polyvinyl alcohol or modified polyvinyl alcohols or polyvinylpyrrolidones.

The emulsifiers can also be modified by means of a corresponding functionalisation in such a manner that they copolymerise radically with the monomers (surfmer).

It is further possible also to use mixtures of the mentioned emulsifiers.

There is preferably used as the emulsifier an alkyl polyether sulfate, such as, for example, the ammonium salt of alkyl polyglycol ether sulfate (obtainable under the name emulsifier Tanemul 951 from Tanatex, DE). The total amount of emulsifier, based on the solid, is from 0.3 to 1.5 wt. %, preferably from 0.3 to 1.0 wt. %.

Composition of the Polychloroprene Dispersions

The preparation of polychloroprenes has been known for a long time; it is carried out by emulsion polymerisation in an alkaline aqueous medium, see, for example, "Methoden der Organischen Chemie" (Houben-Weyl) XIV/1,738 f Georg Thieme Verlag Stuttgart 1961.

The preparation of polychloroprene dispersions is likewise known per se. Corresponding dispersions are prepared, for example, by emulsion polymerisation in an alkaline medium of chloroprene (2-chloro-1,3-butadiene) and optionally of an ethylenically unsaturated monomer that is copolymerisable with chloroprene, as described, for example, in WO02/24825 (p. 3, l.26-p. 7, l.4), DE-A 3 002 734 (p. 8, l.23-p. 12, l.9), WO2005035683(A1) (p. 16 ff) or U.S. Pat. No. 5,773,544 (col. 2, l.9 to col. 4, l.45).

Suitable copolymerisable monomers are described, for example, in "Methoden der Organischen Chemie" (Houben-Weyl) XIV/1, 738 f Georg Thieme Verlag Stuttgart 1961. Preference is given to compounds having from 3 to 12 carbon atoms and 1 or 2 copolymerisable C═C double bonds per molecule. Examples of preferred copolymerisable monomers are 2,3-dichlorobutadiene and 1-chlorobutadiene.

There come into consideration as emulsifiers in principle all compounds and mixtures thereof that stabilise the emulsion adequately, such as, for example, the water-soluble salts, in particular the sodium, potassium and ammonium salts, of long-chain fatty acids, colophony and colophony derivatives, higher molecular weight alcohol sulfates, arylsulfonic acids, formaldehyde condensation products of arylsulfonic acids, non-ionic emulsifiers based on polyethylene oxide and polypropylene oxide, as well as polymers having an emulsifying action, such as polyvinyl alcohol.

Preference is given to those chloroprene dispersions which are stable towards HCl cleavage. This applies particularly to those aqueous polychloroprene dispersions which are distinguished by long storage stability, that is to say whose pH value is in the alkaline range (pH≥8) and does not change significantly during the storage period. The preparation of such dispersions is described comprehensively in WO2005035683(A1) (p. 16 ff). The polychloroprene dispersion to be used according to the invention is prepared by emulsion polymerisation at from 0 to 70° C., preferably at from 5 to 45° C., and at preferred pH values of from 10 to 14.

Activation is carried out by the conventional activators and activator systems. There may be mentioned as examples of activators and activator systems: formamidinesulfinic acid, potassium peroxodisulfate, redox systems based on potassium peroxodisulfate and optionally silver salt (Na salt of anthraquinone-β-sulfonic acid), compounds such as formamidinesulfinic acid, the Na salt of hydroxymethanesulfinic acid, sodium sulfite and sodium dithionite serving as redox partner. Redox systems based on peroxides and hydroperoxides are also suitable. The preparation of the polychloroprenes according to the invention can be carried out both continuously and discontinuously, continuous polymerisation being preferred.

Conventional chain transfer agents such as mercaptans or xanthogen disulfides can be used to adjust the viscosity of the polychloroprenes according to the invention. Particularly preferred chain transfer agents are n-dodecylmercaptan and the xanthogen disulfides used according to DE-A 3 044 811, DE-A 2 306 610 and DE-A 2 156 453.

Low-monomer or monomer-free dispersions are preferably used. After the polymerisation, the residual chloroprene monomer can be removed, for example by steam distillation.

Preference is likewise given to the use of chloroprene dispersions having an increased solids content. The solids content of the dispersion can be increased by a creaming process as described in WO2005035683(A1) (p. 16 ff) and the citations mentioned therein. Solids contents of from 40 to 64 wt. %, particularly preferably from 52 to 59 wt. %, are preferred.

The polychloroprene dispersion preferably has a particle diameter of from 60 to 200 nm, particularly preferably from 60 to 150 nm, most particularly preferably from 60 to 120 nm.

In addition to the polychloroprene particles, further polymer particles such as polyacrylate, styrene-butadiene, acrylonitrile-butadiene, polyurethane and/or polyvinyl acetate particles can be present.

For the use according to the invention as a protective layer, the use of dispersions is preferred over solvent-borne and solvent-free systems. The use of polyurethane dispersions and polyacrylate dispersions with styrene or fluorinated (meth)acrylates as copolymer is particularly preferred.

As well as containing the polymer dispersions, the compositions which can be used for the production of the protective layer can additionally also contain auxiliary substances and additives in order to achieve even surfaces, special wetting behaviour or special layer thicknesses. Examples of such auxiliary substances and additives are crosslinkers, thickeners, cosolvents, thixotropic agents, stabilisers, antioxidants, light stabilisers, emulsifiers, surfactants, plasticisers, pigments, fillers and flow aids, which are sufficiently well known in the surface-coatings industry.

The application of the compositions can be carried out by means of all forms of application known per se, mention being made, for example, of knife application, brushing, pouring or spraying. Processing of the individual layers is effected by pouring or by knife application carried out manually or by machine; printing, screen printing, spraying and dipping are also possible processing techniques. In general, all techniques which can be used in the application of thin layers—for example in surface coating—are conceivable.

A multi-layer application optionally with intermediate drying steps is also possible in principle.

For more rapid drying, temperatures above 30° C. are preferably used. Temperatures of from 30 to 140° C. are preferred. Drying is generally carried out using heating and drying apparatuses known per se, such as (circulating air) drying cabinets, hot air or IR radiators. Drying by passing the coated substrate over heated surfaces, for example rollers, is also possible. Application and drying can each be carried out discontinuously or continuously, but a wholly continuous process is preferred.

The medium according to the invention can have further layers. These can be bonded to the photopolymer film and/or the protective layer in sections or over the entire surface.

The invention further provides the use of a holographic medium according to the invention in the production of holograms, in particular in the production of in-line holograms, off-axis holograms, full-aperture transfer holograms, white light transmission holograms, Denisyuk holograms, off-axis reflection holograms, edge-lit holograms as well as holographic stereograms.

The invention likewise provides a process for the production of a holographic medium according to the invention, in which a photopolymer film is produced from a formulation comprising polyisocyanates, polyols, acrylate writing monomers and photoinitiators and a protective layer is applied to the photopolymer film, the protective layer being impermeable to the constituents of the polymer film, optically clear and transparent to electromagnetic radiation having a wavelength in the range of from 350 to 800 nm.

The invention is explained in greater detail in the following by means of examples.

EXAMPLES

Measuring Methods

The stated OH numbers were determined according to DIN 53240-2.

The stated NCO values (isocyanate contents) were determined according to DIN EN ISO 11909.

The stated amine numbers were determined by Currenta GmbH & Co. OHG, Leverkusen, Germany, using test method AFAM 2011-0605401-05 D analogously to DIN 16945, Section 5.6, wherein, in a departure from the DIN, the perchloric acid solution is purchased and the end point is determined by potentiometry.

Solids Content

The tare weight of an unlacquered can lid and a paper clip was determined. Then, after the initial weighing, about 1 g of the sample to be tested was distributed evenly in the can lid using the suitably bent paper clip. The paper clip was left in the sample for measurement. The initial weight was determined and then heating was carried out for one hour at 125° C. in a laboratory oven, and then the resulting weight was determined. The solids content was determined according to the following equation: resulting weight [g]*100/initial weight [g]=wt. % solids.

The stated viscosities were determined according to DIN EN ISO 3219/A.3 at 23° C. and a shear rate of 40 $s^{-1}$.

Measurement of the Dry Layer Thickness of the Photopolymers

The physical layer thickness was determined using standard white light interferometers such as, for example, the FTM-Lite NIR layer thickness measuring device from Ingenieursbüro Fuchs.

The determination of the layer thickness is based in principle on interference phenomena in thin layers. Light waves that have been reflected at two interfaces of different optical density are superimposed. The undisturbed superimposition of the reflected partial beams leads to periodic lightening and extinction in the spectrum of a white continuum source (e.g. halogen lamp). This superimposition is referred to by the person skilled in the art as interference. The interference spectra are measured and evaluated mathematically.

Measurement of the Holographic Properties DE and Δn of the Holographic Media by Means of Two-Beam Interference in Reflection Arrangement The holographic media produced as described below were subsequently tested for their holographic properties by means of a measuring arrangement according to FIG. 1, as follows:

The beam of a He—Ne laser (emission wavelength 633 nm) was converted with the aid of the spatial filter (SF) and together with the collimation lens (CL) into a parallel homogeneous beam. The final cross-sections of the signal and reference beam are established by the iris diaphragms (I). The diameter of the iris diaphragm opening is 0.4 cm. The polarisation-dependent beam splitters (PBS) split the laser beam into two coherent identically polarised beams. Via the λ/2 plates, the power of the reference beam was adjusted to 0.5 mW and the power of the signal beam was adjusted to 0.65 mW. The powers were determined using the semiconductor detectors (D) with the sample removed. The angle of incidence ($\alpha_0$) of the reference beam is −21.8°, the angle of incidence ($\beta_0$) of the signal beam is 41.8°. The angles are measured starting from the sample normal to the beam direction. According to FIG. 1, $\alpha_0$ therefore has a negative sign and $\alpha_0$ has a positive sign. At the location of the sample (medium), the interference field of the two overlapping beams produced a grating of light and dark strips which are perpendicular to the angle bisectors of the two beams incident on the sample (reflection hologram). The strip spacing Λ, also referred to as the grating period, in the medium is ~225 nm (the refractive index of the medium is assumed to be ~1.504).

FIG. 1 shows the geometry of a holographic media tester (HMT) at λ=633 nm (He—Ne laser): M=mirror, S=shutter, SF=spatial filter, CL=collimator lens, λ/2=λ/2 plate, PBS=polarisation-sensitive beam splitter, D=detector, I=iris diaphragm, $\alpha_0$=−21.8°, $\alpha_0$=41.8° are the angles of incidence of the coherent beams measured outside the sample (outside the medium). RD=reference direction of the turntable.

Holograms were recorded in the medium in the following manner:

Both shutters (S) are open for the exposure time t.

Then, with the shutters (S) closed, the medium was allowed 5 minutes' time for the diffusion of the still unpolymerised writing monomers.

The recorded holograms were then read in the following manner. The shutter of the signal beam remained closed. The shutter of the reference beam was opened. The iris diaphragm of the reference beam was closed to a diameter <1 mm. This ensured that the beam was always completely within the previously recorded hologram for all angles of rotation (Ω) of the medium. The turntable, under computer control, covered the angle range from $\Omega_{min}$ to $\Omega_{max}$ with an angle step width of 0.05°. Ω is measured from the sample normal to the reference direction of the turntable. The reference direction of the turntable is obtained when, during recording of the hologram, the angle of incidence of the reference beam and of the signal beam are of equal magnitude, that is to say $\alpha_0$=−31.8° and $\alpha_0$=31.8°. $\Omega_{recording}$ is then 0°. For $\alpha_0$=−21.8° and $\beta_0$=41.8°, $\Omega_{recording}$ is therefore 10°. The following is generally true for the interference field during recording of the hologram:

$$\alpha_0 = \theta_0 + \Omega_{recording}.$$

$\theta_0$ is the semiangle in the laboratory system outside the medium, and the following is true during recording of the hologram:

$$\theta_0 = \frac{\alpha_0 - \beta_0}{2}.$$

In this case, $\theta_0$ is therefore −31.8°. At each angle of rotation Ω approached, the powers of the beam transmitted in the zeroth order were measured by means of the corresponding detector D and the powers of the beam diffracted in the first order were measured by means of the detector D. At each angle Ω approached, the diffraction efficiency was obtained as the quotient of:

$$\eta = \frac{P_D}{P_D + P_T}$$

$P_D$ is the power in the detector of the diffracted beam and $P_T$ is the power in the detector of the transmitted beam.

By means of the above-described method, the Bragg curve, which describes the diffraction efficiency η in dependence on the angle of rotation Ω of the recorded hologram, was measured and stored in a computer. In addition, the intensity transmitted in the zeroth order was also plotted against the angle of rotation Ω and stored in a computer.

The maximum diffraction efficiency (DE=$\eta_{max}$) of the hologram, that is to say its peak value, was determined at $\Omega_{reconstruction}$. To that end, the position of the detector of the diffracted beam optionally had to be changed in order to determine that maximum value.

The refractive index contrast Δn and the thickness d of the photopolymer layer were then determined by means of the coupled wave theory (see H. Kogelnik, The Bell System Technical Journal, Volume 48, November 1969, Number 9 page 2909 to page 2947) from the measured Bragg curve and the angle variation in the transmitted intensity. It should be noted that, owing to the thickness shrinkage occurring as a result of the photopolymerisation, the strip spacing Λ' of the hologram and the orientation of the strips (slant) can differ from the strip spacing Λ of the interference pattern and its orientation. Accordingly, the angle $\alpha_0'$, or the corresponding angle of the turntable $\Omega_{reconstruction}$, at which maximum diffraction efficiency is achieved will also differ from $\alpha_0$ or from the corresponding $\Omega_{recording}$. As a result, the Bragg condition changes. This change is taken into account in the evaluation method. The evaluation method is described in the following:

All geometric quantities which relate to the recorded hologram and not to the interference pattern are shown as primed quantities.

According to Kogelnik, the following applies for the Bragg curve η(Ω) of a reflection hologram:

$$\eta = \begin{cases} \dfrac{1}{1 - \dfrac{1 - (\xi/\nu)^2}{\sin^2\left(\sqrt{\xi^2 - \nu^2}\right)}}, & \text{for } \nu^2 - \xi^2 < 0 \\[2ex] \dfrac{1}{1 + \dfrac{1 - (\xi/\nu)^2}{\sinh^2\left(\sqrt{\nu^2 - \xi^2}\right)}}, & \text{for } \nu^2 - \xi^2 \geq 0 \end{cases}$$

with:

-continued $$v = \frac{\pi \cdot \Delta n \cdot d'}{\lambda \cdot \sqrt{|c_s \cdot c_r|}}$$

$$\xi = -\frac{d'}{2 \cdot c_s} \cdot DP$$

$$c_s = \cos(\vartheta') - \cos(\psi') \cdot \frac{\lambda}{n \cdot \Lambda'}$$

$$c_r = \cos(\vartheta')$$

$$DP = \frac{\pi}{\Lambda'} \cdot \left(2 \cdot \cos(\psi' - \vartheta') - \frac{\lambda}{n \cdot \Lambda'}\right)$$

$$\psi' = \frac{\beta' + \alpha'}{2}$$

$$\Lambda' = \frac{\lambda}{2 \cdot n \cdot \cos(\psi' - \alpha')}$$

When reading the hologram ("reconstruction"), the following applies as shown analogously above:

$$\theta'_0 = \theta_0 + \Omega$$

$$\sin(\theta'_0) = n \cdot \sin(\theta')$$

Under the Bragg condition, the "dephasing" DP is 0. Accordingly, the following applies:

$$\alpha'_0 = \theta_0 + \Omega_{reconstruction}$$

$$\sin(\alpha'_0) = n \cdot \sin(\alpha')$$

The still unknown angle β' can be determined from the comparison of the Bragg condition of the interference field during recording of the hologram and the Bragg condition during reading of the hologram, assuming that only thickness shrinkage takes place. It then follows that:

$$\sin(\beta') = \frac{1}{n} \cdot [\sin(\alpha_0) + \sin(\beta_0) - \sin(\theta_0 + \Omega_{reconstruction})]$$

ν is the grating thickness, ξ is the detuning parameter and ψ' is the orientation (slant) of the refractive index grating which has been recorded. α' and β' correspond to the angles $\alpha_0$ and $\beta_0$ of the interference film during recording of the hologram, but measured in the medium and applicable to the grating of the hologram (after thickness shrinkage). n is the mean refractive index of the photopolymer and was set at 1.504. λ is the wavelength of the laser light in vacuo.

The maximum diffraction efficiency (DE=$\eta_{max}$) for ξ=0 is then:

$$DE = \tanh^2(v) = \tanh^2\left(\frac{\pi \cdot \Delta n \cdot d'}{\lambda \cdot \sqrt{\cos(\alpha') \cdot \cos(\alpha' - 2\psi)}}\right)$$

The measured data of the diffraction efficiency, the theoretical Bragg curve and the transmitted intensity are plotted, as shown in FIG. 2, against the centred angle of rotation $\Delta\Omega = \Omega_{reconstruction} - \Omega = \alpha'_0 - \theta'_0$ also referred to as angle detuning.

Because DE is known, the shape of the theoretical Bragg curve according to Kogelnik is determined only by the thickness d' of the photopolymer layer. Δn is corrected via DE for a given thickness d' so that measurement and theory of DE always agree. d' is then adjusted until the angle positions of the first secondary minima of the theoretical Bragg curve correspond with the angle positions of the first secondary maxima of the transmitted intensity and, in addition, the full width at half maximum (FWHM) for the theoretical Bragg curve and for the transmitted intensity correspond.

Because the direction in which a reflection hologram corotates on reconstruction by means of a Ω scan, but the detector for the diffracted light can cover only a finite angular range, a Ω scan does not cover the Bragg curve of broad holograms (small d') completely but covers only the central region, with suitable detector positioning. The shape of the transmitted intensity, which is complementary to the Bragg curve, is therefore additionally used for adjusting the layer thickness d'.

FIG. 2 shows the measured transmitted power $P_T$ (right y-axis) as a solid line plotted against the angle detuning ΔΩ, the measured diffraction efficiency η (left y-axis) as solid circles plotted against the angle detuning ΔΩ (in so far as permitted by the finite size of the detector), and the adaptation of the Kogelnik theory as a broken line (left y-axis).

For one formulation, this procedure was optionally repeated several times for different exposure times t on different media in order to determine the mean energy dose of the incident laser beam during recording of the hologram at which DE becomes the saturation value. The mean energy dose E is obtained as follows from the powers of the two partial beams associated with the angles $\alpha_0$ and $\beta_0$ (reference beam with $P_r$=0.50 mW and signal beam with $P_s$=0.63 mW), the exposure time t and the diameter of the iris diaphragm (0.4 cm):

$$E(\text{mJ/cm}^2) = \frac{2 \cdot [P_r + P_s] \cdot t(s)}{\pi \cdot 0.4^2 \text{ cm}^2}$$

The powers of the partial beams were so adjusted that the same power density is achieved in the medium at the angles $\alpha_0$ and $\beta_0$ used.

As alternative I, a test equivalent to the system shown in FIG. 1 was carried out with a green laser of emission wavelength 2 in vacuo of 532 nm. In this test, $\alpha_0$=−11.5° and $\beta_0$=33.5° and $P_r$=1.84 mW and $P_s$=2.16 mW.

In the examples, the maximum value in Δn is recorded in each case, the doses used are between 4 and 64 mJ/cm² per arm.

Production of Test Holograms in the Holographic Media by Means of Two-Beam Interference in Denisyuk Arrangement:

The media produced as described in the section "Production of the holographic media on the basis of photopolymer formulation with photoinitiator for determining the holographic performance" were then tested for their holographic properties by means of a measuring arrangement according to FIG. 3, as follows:

The beam of a laser (emission wavelength 633 nm or 532 nm) is diverged to a diameter of ~3-4 cm with the aid of an optional diverging lens (AF) and the collimation lens (CL), which is located downstream of the shutter S. The diameter of the diverged laser beam is determined by the aperture of the opened shutter. An uneven intensity distribution of the diverged laser beam is consciously ensured. The peripheral intensity $P_R$ is thus ~only half the intensity $P_Z$ in the centre of the diverged laser beam. P is here to be understood as being power/surface area. The diverged laser beam first passes through a glass plate which is positioned at an angle relative to the beam and serves as a shearing plate (SP). By means of the upwardly reflected interference pattern, which is produced by the two glass surface reflections of the SP, it can be determined whether the laser is emitting stably in single mode. Then is to be seen on a matt plate of dark and light strips placed over the SP. Only when there is single mode emission are holographic exposures carried out. In the case of the DPSS laser, single mode can be achieved by adjustment of the pump stream. The diverged beam passes through the holographic medium (P) placed at an angle of about 15°, this portion forms the reference beam, and is then reflected from the object (O) arranged parallel to P back into P again. This portion forms the signal beam of the Denisyuk arrangement.

The interference of the signal beam and the reference beam in P produces the hologram in the holographic medium. O consists of a metal plate covered with white paper, the paper side P facing. On the paper there is a square grid produced by black lines. The edge length of a square is 0.5 cm. This grid is also formed in the hologram during the holographic exposure of P.

Figure 4:
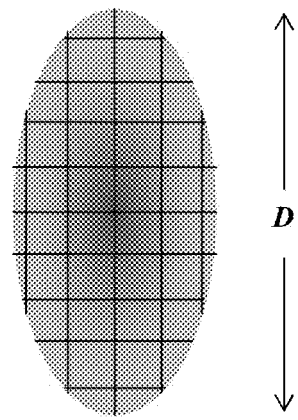
Figure 4 shows the elliptical shape of a hologram recorded under Figure 3.

The average exposure dose $E_{ave}$ is established by the opening time t of S. At fixed laser power I, t therefore represents the value proportional to $E_{ave}$. Since the diverged laser beam has an uneven (bell-shaped) intensity distribution, the local dose E for producing the hologram in P varies. This, together with the inclined position of P and O to the optical axis, leads to the recorded hologram having an elliptical shape, as is shown in FIG. 4.

Because O is a diffuse reflector, the hologram can readily be reconstructed by exposure with a point light source (e.g. torch or LED lamp).

Substances Used for Photopolymers 1, 2 and 3:
Polymer matrix 1: consisting of Desmodur® XP 2599 (component A1), a product of Bayer MaterialScience AG, Leverkusen, Del., full allophanate of hexane diisocyanate on polypropylene glycol of number-average molar mass 2000, NCO content: 5.6-6.4% and difunctional polypropylene glycol of number-average molar mass 4000 (component B1).
Polymer matrix 2: consisting of Desmodur® N 3900 (component A2), product of Bayer MaterialScience AG, Leverkusen, Germany, hexane-diisocyanate-based polyisocyanate, proportion of iminooxadiazinedione at least 30%, NCO content: 23.5%, and polyol 1 (component B2).

Polyol 1 is an experimental product of Bayer MaterialScience AG, Leverkusen, Germany, its preparation is described below.

Writing monomer 1 is an experimental product of Bayer MaterialScience AG, Leverkusen, Germany, its preparation is described below.

Writing monomer 2 is an experimental product of Bayer MaterialScience AG, Leverkusen, Germany, its preparation is described below.

Additive 1 is an experimental product of Bayer MaterialScience AG, Leverkusen, Germany, its preparation is described below.

Photoinitiator 1: new methylene blue 0.05%, ethyl violet 0.05% and Astrazon Orange G 0.05% with CGI 909 (product of BASF SE, Basel, Switzerland) 1.5%, as solution dissolved in N-ethylpyrrolidone (NEP), proportion of NEP 3.5%.
Photoinitiator 2: new methylene blue 0.20%, Safranin O 0.10% and Astrazon Orange G 0.10% with CGI 909 (product of BASF SE, Basel, Switzerland) 1.5%, as solution dissolved in N-ethylpyrrolidone (NEP), proportion of NEP 3.5%.

Catalyst 1: Fomrez® UL28 0.5%, urethanisation catalyst, dimethylbis[(1-oxoneodecyl)oxy]stannane, product of Momentive Performance Chemicals, Wilton, Conn., USA (used as a 10% strength solution in N-ethylpyrrolidone).

Byk® 310 (silicone-based surface additive from BYK-Chemie GmbH, Wesel, 25% strength solution in xylene) 0.3%.

Substrate 1: Makrofol DE 1-1 CC 175 μm (Bayer MaterialScience AG, Leverkusen, Germany).
Substrate 2: polyethylene terephthalate film, 36 μm, type Hostaphan® RNK, from Mitsubishi Chemicals, Germany.
Preparation of Polyol 1:

0.18 g of tin octoate, 374.8 g of ε-caprolactone and 374.8 g of a difunctional polytetrahydro-furan polyether polyol (equivalent weight 500 g/mol OH) were placed in a 1-liter flask, heated to 120° C. and maintained at that temperature until the solids content (proportion of non-volatile constituents) was 99.5 wt. % or more. Cooling was then carried out and the product was obtained in the form of a waxy solid.

Preparation of writing monomer 1 (phosphorthioyl-tris(oxy-4,1-phenyleneimino-carbonyloxyethane-2,1-diyl)triacrylate)

0.1 g of 2,6-di-tert-butyl-4-methylphenol, 0.05 g of dibutyltin dilaurate (Desmorapid Z, Bayer MaterialScience AG, Leverkusen, Germany) and 213.07 g of a 27% strength solution of tris(p-isocyanatophenyl)thiophosphate in ethyl acetate (Desmodur® RFE, product of Bayer MaterialScience AG, Leverkusen, Germany) were placed in a 500 ml round-bottomed flask and heated to 60° C. 42.37 g of 2-hydroxyethyl acrylate were then added dropwise and the mixture was maintained at 60° C. until the isocyanate content had fallen below 0.1%. Cooling was then carried out and the ethyl acetate was removed completely in vacuo. The product was obtained in the form of a semi-crystalline solid.

Preparation of writing monomer 2 (2-({[3-(methylsulfanyl)phenyl]carbamoyl}oxy)ethyl prop-2-enoate)

0.02 g of 2,6-di-tert-butyl-4-methylphenol, 0.01 g of Desmorapid® Z, 11.7 g of 3-(methylthio)phenyl isocyanate were placed in a 100 ml round-bottomed flask and heated to 60° C. 8.2 g of 2-hydroxyethyl acrylate were then added dropwise and the mixture was maintained at 60° C. until the isocyanate content had fallen below 0.1%. Cooling was then carried out. The product was obtained in the form of a light-yellow liquid.

Preparation of additive 1 (bis(2,2,3,3,4,4,5,5,6,6,7,7-dodecafluoroheptyl)-(2,2,4-trimethylhexane-1,6-diyl)biscarbamate)

0.02 g of Desmorapid® Z and 3.60 g of 2,4,4-trimethylhexane-1,6-diisocyanate (TMDI) were placed in a 2000 ml round-bottomed flask and heated to 70° C. 11.39 g of 2,2,3,3,4,4,5,5,6,6,7,7-dodecafluoroheptan-1-ol were then added dropwise and the mixture was maintained at 70° C. until the isocyanate content had fallen below 0.1%. Cooling was then carried out. The product was obtained in the form of a colourless oil.

Production of the Photopolymer Films:
Photopolymer 1:

13.75 g of writing monomer 1, then 0.275 g of catalyst 1 and 0.165 g of Byk® 310, and finally a solution of 0.825 g of CGI 909, 0.028 g of new methylene blue, 0.028 g of ethyl violet and 0.028 g of Astrazon Orange G in 1.678 g of N-ethylpyrrolidone (together photoinitiator 1) were added stepwise in the dark to 27.83 g of component B1 and mixed so that a clear solution was obtained. 10.395 g of component A1 were then added at 30° C., and mixing was carried out again. The resulting liquid composition was then applied to substrate 1 and dried for 4.5 minutes at 80° C. Thy layer thickness: 45 μm. Maximum Δn: 0.0134 (633 nm); 0.0122 (532 nm).

Photopolymer 2:

3.00 g of writing monomer 1, 3.00 g of writing monomer 2 and 5.00 g of additive 1, then 0.020 g of catalyst 1 and 0.060 g of Byk® 310, and finally a solution of 0.300 g of CGI 909, 0.040 g of new methylene blue, 0.020 g of Safranin 0 and 0.020 g of Astrazon Orange G in 0.682 g of N-ethylpyrrolidone (together photoinitiator 2) were added stepwise in the dark to 6.63 g of component B2 and mixed so that a clear solution was obtained. 1.228 g of component A2 were then added at 30° C., and mixing was carried out again. The resulting liquid composition was then applied to substrate 2 and dried for 4.5 minutes at 80° C. Dry layer thickness: 15 μm. Maximum Δn: 0.0320 (633 nm); 0.0292 (532 nm).

Photopolymer 3:

3.00 g of writing monomer 1, 3.00 g of writing monomer 2 and 5.00 g of additive 1, then 0.020 g of catalyst 1 and 0.060 g of Byk® 310, and finally a solution of 0.300 g of CGI 909, 0.040 g of new methylene blue (recrystallised as dodecylbenzenesulfonate), 0.020 g of Safranin 0 (recrystallised as dodecylbenzenesulfonate) and 0.020 g of Astrazon Orange G (recrystallised as dodecylbenzenesulfonate) in 0.682 g of N-ethylpyrrolidone were added stepwise in the dark to 6.63 g of component B2 and mixed so that a clear solution was obtained. 1.228 g of component A2 were then added at 30° C., and mixing was carried out again. The resulting liquid composition was then applied to substrate 2 and dried for 4.5 minutes at 80° C. Thy layer thickness: 14 μm. Maximum Δn: 0.0288 (633 nm).

Starting Compounds for the Production of the Protective Layers:

PMMA: poly(methyl methacrylate), obtainable from Lucite International Inc., Cordova, Tenn., USA (Elvacite Grade 2041).

APEC 1800: product of Bayer MaterialScience AG, Leverkusen, Del., polycarbonate type, based on reaction of phosgene with bisphenol A and trimethylcyclohexane-bisphenol, 20% strength dissolved in 1-methoxy-2-propanol acetate (40%), trimethylbenzene (20%), ethyl 3-ethoxypropionate (40%).

Fomrez® UL28: urethanisation catalyst, dimethylbis[(1-oxoneodecyl)oxy]stannane, commercial product of Momentive Performance Chemicals, Wilton, Conn., USA (used as 10% strength solution in N-ethylpyrrolidone).

Desmodur® N 3900: product of Bayer MaterialScience AG, Leverkusen, Germany, hexane-diisocyanate-based polyisocyanate, proportion of iminooxadiazinedione at least 30%, NCO content: 23.5%.

Desmophen® NH 1420: product of Bayer MaterialScience AG, Leverkusen, Germany, amino-functional, amine number 200.

Desmodur® N 3600: product of Bayer MaterialScience AG, Leverkusen, Germany, hexane-diisocyanate-based trimer, NCO content: 22.85%.

Desmophen® 1800: product of Bayer MaterialScience AG, Leverkusen, Germany, polyester polyol based on adipic acid, diethylene glycol and trimethylolpropane, OH number 61.2.

Desmodur® L67 MPA/X: product of Bayer MaterialScience AG, Leverkusen, Germany, aromatic polyisocyanate based on toluene diisocyanate, 67% strength in ethyl glycol acetate/xylene 1:1, NCO content: 11.9%.

DBTL: dibutyltin dilaurate, urethanisation catalyst, as Desmorapid® Z product of Bayer MaterialScience AG, Leverkusen, Germany.

Desmophen® 670: product of Bayer MaterialScience AG, Leverkusen, Germany, weakly branched, hydroxyl-group-containing polyester based on adipic acid, isophthalic acid, phthalic anhydride, adipol and trimethylolpropane, OH number 142.0.

Desmodur® N75 MPA: product of Bayer MaterialScience AG, Leverkusen, Germany, aliphatic polyisocyanate based on hexamethylene diisocyanate (HDI), 75% strength in 1-methoxypropyl 2-acetate, NCO content 16.5%.

PolyTHF® 2000: polytetramethylene glycol polyol, OH number 56 mg KOH/g, number-average molecular weight 2000 g/mol (BASF SE, Ludwigshafen, Germany).

PolyTHF® 1000: polytetramethylene glycol polyol, OH number 112 mg KOH/g, number-average molecular weight 1000 g/mol (BASF SE, Ludwigshafen, Germany).

Bayhydrol® UV 2720/1 XP: product of Bayer MaterialScience AG, Leverkusen, Germany, anionic, aqueous UV-curable polyurethane dispersion, solids content about 40%.

Bindzil® CC 401: product of Akzo Chemicals GmbH, colloidal, aqueous silica dispersion having mean particles sizes of 12 nm (manufacturer's information).

Bayhydrol® UH XP 2648: product of Bayer MaterialScience AG, Leverkusen, Germany, aliphatic, polycarbonate-containing anionic polyurethane dispersion, solvent-free, solids content about 35%.

Irgacure® 500: UV initiator, product of BASF SE, Basel, Switzerland.

Byk® 346 (silicone-based surface additive of BYK-Chemie GmbH, Wesel, solution in dipropylene glycol monomethyl ether (48%)).

Borchi® Gel 0625: product of OMG Borchers GmbH, thickener.

Dispercoll® C VP LS 2372/1: product of Bayer MaterialScience AG, Leverkusen, Germany, aqueous-colloidal dispersion of a polymer of 2-chlorobutadiene (about 58% solids content).

Preparation of Polyurethane Solution I:

200 g of PolyTHF® 2000 and 50 g of PolyTHF® 1000 were heated to 80° C. in a standard stirring apparatus. A mixture of 66.72 g of isophorone diisocyanate and 500 g of ethyl acetate was then added at 80° C. in the course of 5 minutes, and stirring was carried out at reflux until the theoretical NCO value was reached (about 8 hours). The finished prepolymer was cooled to 20° C., and then a solution of 31.3 g of methylenebis(4-aminocyclohexane) and 500 g of isopropanol was metered in the course of 30 minutes. Stirring was then continued until no further free isocyanate groups could be detected by IR spectroscopy. The resulting clear solution has a solids content of 25 wt. % and a viscosity of 4600 mPas (23° C.).

Preparation of Polyurethane Dispersion II:

56.9 g of Bayhydrol® UV 2720/1 XP, 24.2 g of Bindzil® CC 401 and 8.4 g of Bayhydrol® UH XP 2648 are combined, with stirring. A solution of 0.7 g of Irgacure® 500 in 9.0 g of (1-methoxypropanol/4-hydroxy-4-methylpentan-2-one (1:1)) is then added with vigorous stirring. 0.3 g of Byk® 346 and 0.5 g of Borchi® Gel 0625 are then dispersed in with vigorous stirring. Stirring is then continued for about 15 minutes.

Preparation of Polyurethane Dispersion III 48.6 g of Bayhydrol® UV XP 2720/1 XP, 10.5 g of Bindzil® CC 401 and 7.9 g of Bayhydrol® UH XP 2648 were combined, with stirring. A solution of 0.6 g of Irgacure® 500, 0.4 g of Borchi® Gel 0625 and 0.2 g of Byk® 346 in 8.0 g of (1-methoxypropanol/4-hydroxy-4-methylpentan-2-one (1:1)) was then added, with vigorous stirring. Stirring was then continued for about 15 minutes.

Preparation of the Polyacrylate-Based Dispersions W and V:

Water was placed with the corresponding amount of emulsifier in a 3-liter glass reactor with regulated heating and cooling and a stirring motor, under a nitrogen atmosphere. The solution was then heated to 80° C. When the polymerisation temperature was reached, monomer mixture M1 and initiator solution W1 for the preparation of the internal seed were added in the course of 30 minutes via a metering pump, and then stirring was continued for a further 30 minutes. Monomer mixture M2 and the aqueous solution W2 were then metered in the course of 240 minutes Immediately after completion of the metered additions of M2 and W2, the aqueous solution W3 for post-activation was metered in the course of 60 minutes, and the dispersion was stirred further for a period of 60 minutes and then cooled. In order to adjust the pH to pH 7, the corresponding amount of ammoniacal solution (W4) was slowly added dropwise and the finished dispersion is passed through a 125 μm filter.

|  |  | Dispersion IV amount (g) | Dispersion V amount (g) |
|---|---|---|---|
| Initial charge | Emulsifier Tanemul 951 (21.5%) | 15.5 | 24.5 |
|  | Deionised water | 800 | 570 |
| M1 | Methyl methacrylate | 35.3 |  |
|  | Butyl acrylate | 25.3 |  |
|  | Styrene |  | 60 |
| W1 | Ammonium persulfate | 0.5 | 0.5 |
|  | Deionised water | 70 | 70 |
| M2 | Methyl methacrylate | 35.2 |  |
|  | Butyl acrylate | 25.4 |  |
|  | Hydroxyethyl methacrylate | 42.9 |  |
|  | Styrene | 330 | 595 |
|  | Ethylhexyl acrylate | 252.3 | 225 |
|  | 2-(Perfluororhexyl)ethyl methacrylate |  | 9.3 |
|  | Acrylic acid | 4.1 | 29 |
| W2 | Ammonium persulfate | 3.5 | 3.6 |
|  | Emulsifier Tanemul 951 | 15.1 | 24 |
|  | Deionised water | 500 | 500 |
| W3 | Ammonium persulfate | 0.65 | 0.65 |
|  | Deionised water | 70 | 70 |
| W4 | Ammonia (33%) | 3.3 | 11.5 |
|  | Deionised water | 19 | 17 |
| Solids content/% |  | 35 | 42.3 |
| Viscosity/mPas |  | 10.5 | 30.4 |

Production of the Media

DIN A4 sized sheets were cut from the above-described photopolymer films 1 and 2 in the dark. The sheets were coated with various protective lacquers with the aid of a Zehnter applicator (automatic film applicator) with a blade clearance for a target dry layer thickness of 5-10 μm.

Comparison Example 1

PMMA (Mn about 100,000 g/mol) was applied in the dark to photopolymer film 1 by means of the automatic film applicator from organic solution (10% solution in butyl acetate, toluene, butanone or cyclohexanone). It was already apparent during the application that parts of the photopolymer solution were washed out (coloured). Curing of the PMMA film was achieved by physical drying (2 h @ 60° C.), but the film became friable and brittle (small cracks in the surface). The film was no longer usable for the recording of holograms.

Example 1

A 2K PU system was used. 9.1 g of Desmophen NH 1420 were weighed into a Speedmix beaker; 5.894 g of Desmodur® N 3900 and 0.060 g of Fomrez® UL 28 were added and the whole was mixed briefly. The resulting liquid composition was then applied in the dark to photopolymer film 1 by means of the automatic film applicator. Curing was carried out for 2 hours at 60° C. in a drying cabinet and then overnight at RT. Maximum Δn: 0.0059 (532 nm).

Example 2

A 2K PU system was used. 8.969 g of Desmophen® NH 1420 were weighed into a Speedmix beaker; 6.025 g of Desmodur® N 3600 and 0.060 g of Fomrez® UL 28 were added and the whole was mixed briefly. The resulting liquid composition was then applied in the dark to photopolymer film 1 by means of the automatic film applicator. Curing was carried out for 2 hours at 60° C. in a drying cabinet and then overnight at RT. Maximum Δn: 0.0051 (633 nm).

Example 3

A 2K PU system was used. 10.768 g of Desmophen® 1800 were weighed into a Speedmix beaker; 4.229 g of Desmodur® L67 MPA and 0.003 g of DBTL were added and the whole was mixed briefly. The resulting liquid composition was then applied in the dark to photopolymer film 1 by means of the automatic film applicator. Curing was carried out for 2 hours at 60° C. in a drying cabinet and then overnight at RT. Maximum Δn: 0.0060 (633 nm).

Example 4

A solvent-borne 2K PU system was used. 8.96 g of Desmophen® 670 were weighed into a Speedmix beaker; 0.149 g of Byk 310, 5.88 g of Desmodur® N 75 MPA (contains 25% 1-methoxy-2-propyl acetate) and 0.003 g of DBTL were added and the whole was mixed briefly. The resulting liquid composition was then applied in the dark to photopolymer film 1 by means of the automatic film applicator. Curing was carried out for 2 hours at 60° C. in a drying cabinet and then overnight at RT. Maximum Δn: 0.0082 (633 nm).

Example 5

A solvent-borne 1K PU system was used. Polyurethane solution I was applied in the dark to photopolymer film 1 by means of an automatic film applicator. Drying was carried out for 2 hours at 60° C. in a drying cabinet and then overnight at RT. Maximum Δn: 0.0105 (633 nm); 0.0110 (532 nm).

Example 6

A water-borne 1K PU system was used. Polyurethane dispersion II was applied in the dark to photopolymer film 1 by means of an automatic film applicator. Drying was carried out for 2 hours at 60° C. in a drying cabinet and then overnight at RT. Maximum Δn: 0.0122 (633 nm).

Example 7

A 2K PU system was used. 8.88 g of Desmophen® NH 1420 and 0.149 g of Byk® 310 were weighed into a Speedmix beaker; 5.965 g of Desmodur® N 3600 and 0.059 g of Fomrez® UL 28 were added and the whole was mixed briefly. The resulting liquid composition was then applied in the dark to photopolymer film 2 by means of the automatic film applicator. Curing was carried out for 2 hours at 60° C. in a drying cabinet and then overnight at RT. Maximum Δn: 0.0150 (532 nm; measurement with water as immersion agent).

Example 8

A 2K PU system was used. 11.571 g of Desmophen® 1800 and 0.149 g of Byk® 310 were weighed into a Speedmix beaker; 3.277 g of Desmodur® N75 MPA and 0.003 g of DBTL were added and the whole was mixed briefly. The resulting liquid composition was then applied in the dark to photopolymer film 2 by means of the automatic film applicator. Curing was carried out for 2 hours at 60° C. in a drying cabinet and then overnight at RT. Maximum Δn: 0.0064 (633 nm); 0.0075 (532 nm).

Example 9

A solvent-borne 1K PU system was used. Polyurethane solution I was applied in the dark to photopolymer film 2 by means of an automatic film applicator. Drying was carried out for 2 hours at 60° C. in a drying cabinet and then overnight at RT. Maximum Δn: 0.0230 (532 nm).

Example 10

A water-borne 1K PU system was used. Polyurethane dispersion II was applied in the dark to photopolymer film 2 by means of an automatic film applicator. Drying was carried out for 2 hours at 60° C. in a drying cabinet and then overnight at RT. Maximum Δn: 0.0285 (633 nm); 0.0220 (532 nm).

Example 11

A water-borne polyacrylate system was used. Dispersion V was applied in the dark to photopolymer film 2 by means of an automatic film applicator. Drying was carried out for 2 hours at 60° C. in a drying cabinet and then overnight at RT. Maximum Δn (for the measurement, water was used as immersion agent): 0.0234 (633 nm).

Example 12

A water-borne polyacrylate system was used. 0.30 wt. % Byk® 380N (non-ionogenic surface additive based on an acrylate polymer solution from BYK-Chemie GmbH, Wesel, 52% strength solution in dipropylene glycol monomethyl ether) and 0.20 wt. % Borchigel ALA (thickener, product of OMG Borchers GmbH, Langenfeld (Rheinland), Germany) were first added as additives to dispersion W, and then the dispersion was applied in the dark to photopolymer 3 by means of an automatic film applicator. Drying was carried out for 2 hours at 60° C. in a drying cabinet and then overnight at RT. Maximum Δn: 0.0237 (633 nm).

Example 13

A water-borne 1K PU system was used. The formulation Bayhydrol XP 2606 (slightly branched, non-functional polyurethane dispersion based on 39% Desmophen® C 1200, 12.7% Desmodur® W and 29% Desmodur® 1 in water, 36.4% strength) was applied in the dark to photopolymer film 2 by means of an automatic film applicator. Drying was carried out for 2 hours at 60° C. in a drying cabinet and then overnight at RT. Maximum Δn: 0.0175 (633 nm); 0.0244 (532 nm).

Example 14

A water-borne 1K PU system was used. A physical mixture of 80 wt. % formulation Bayhydrol® XP 2558 (linear, non-functional polyurethane dispersion based on 37.5% Baycoll® XP 2401 (difunctional polyester based on adipic acid/1,6-hexanediol, Mn=2400 g/mol) and 41.4% Desmodur® I in water, 37.5% strength) and 20 wt. % formulation Bayhydrol® R2753 was applied in the dark to photopolymer film 2 by means of an automatic film applicator. Drying was carried out for 2 hours at 60° C. in a drying cabinet and then overnight at RT. Maximum Δn: 0.0200 (633 nm); 0.0220 (532 nm).

Example 15

A water-borne 1K PU system was used. Polyurethane dispersion III was applied in the dark to photopolymer film 2 by means of an automatic film applicator. Drying was carried out for 2 hours at 60° C. in a drying cabinet and then overnight at RT. Maximum Δn: 0.0160 (633 nm).

Example 16

A water-borne 1K PU system was used. The formulation Bayhydrol UV XP 2690 (linear, ethylenically unsaturated polyurethane dispersion based on 51.9% polyester acrylate WDJ 478 and 39.6% Desmodur® W in water, about 40% strength) was applied in the dark to photopolymer film 2 by means of an automatic film applicator. Drying was carried out for 2 hours at 60° C. in a drying cabinet and then overnight at RT. Maximum Δn: 0.0186 (532 nm).

Example 17

An aqueous-colloidal dispersion of poly-(2-chlorobutadiene) (58% strength) was used. The formulation Dispercoll® C VP LS 2372/1 (product of Bayer MaterialScience AG, Leverkusen, Del.) was applied in the dark to photopolymer film 2 by means of an automatic film applicator. Drying was carried out for 2 hours at 60° C. in a drying cabinet and then overnight at RT. Maximum Δn: 0.0231 (633 nm); 0.0287 (532 nm).

Exposure and Testing of the Media

Holograms were exposed as described above in Denisyuk arrangement with laser wavelengths of 532 nm and 633 nm into media of photopolymer 2, Example 10 and Example 12. The resulting holograms were then subjected to a bleaching step under UV light. To that end, the holograms laminated into a glass plate are placed, glass side up, on the conveyor belt of a UV installation and exposed twice, at a belt speed of 2.5 m/min, under a lamp of the Fusion UV 558434 KR 85 type from Fusion UV Systems GmbH, Ismaning, Germany with a nominal power density of 80 W/cm$^2$ with an energy density on the photopolymer of about 2 J/cm$^2$.

As adhesives there were used the adhesive tapes and adhesives listed in the tables below, all of which, with photopolymer 2, cause a marked colour change of the hologram, which is visible even with the naked eye. On adhesive bonding with the adhesive tapes, a blue shift (hypsochromic effect) occurs in the case of monochromatic holograms, on adhesive bonding with the mentioned liquid adhesive, pronounced swelling occurs, resulting in a red shift (bathochromic effect) of the bonded hologram. Comparable effects are not to be observed with any hologram produced using a medium according to Examples 10 and 12.

The following adhesive tapes were tested:

| Adhesive tape | Constituents/Basis |
| --- | --- |
| Aslan C 114 from ASLAN, Schwarz GmbH & Co. KG, Overath, Germany | Acrylate-based pressure-sensitive tape |
| MACal 9800 from MACtac Europe, Soignies, Belgium | Acrylate-based pressure-sensitive tape |
| Scotchcal ® F 400 from 3M Deutschland GmbH, Neuss | Pressure-sensitive adhesive based on modified acrylates |

The adhesive tapes were bonded to the photopolymer by pressure bonding by hand or by means of a roll laminator. The samples were then stored for 7 days at room temperature and for a further 3 days at 60° C. and then the holograms were examined visually. A change in the colour of the hologram did not occur.

In addition, a test was carried out with a liquid adhesive:

| Adhesive | Constituents/Basis |
| --- | --- |
| Desmolux ® U 100, Desmolux ® LS 2396, 20% tetrahydrofuryl acrylate | PU-based UV system with urethane acrylates as radiation-curing component and reactive diluent |

The Denisyuk holograms produced as described above were coated on the photopolymer film with the adhesive, and the mixture was cured under a lamp of the Fusion UV 558434 KR 85 type from Fusion UV Systems GmbH, Ismaning, Germany with a nominal power density of 80 W/cm$^2$ with an energy density on the photopolymer of about 2 J/cm$^2$. Adhesive tapes 2 to 4 were bonded with the photopolymer by pressure bonding by hand or by means of a roll laminator. The samples were then stored for 7 days at RT and for a further 3 days at 60° C. and then the holograms were examined visually. A change in the colour of the hologram did not occur.

The invention claimed is:

1. A holographic medium comprising a protective layer and a photopolymer film which is bonded to the protective layer and contains polyurethane matrix polymers, acrylate writing monomers and photoinitiators, wherein the protective layer is impermeable to the constituents of the photopolymer film, is optically clear and is transparent to electromagnetic radiation having a wavelength in the range of from 350 to 800 nm, wherein the protective layer comprises high molecular weight, uncrosslinked polymers or three-dimensional network structures of high network density, wherein the high molecular weight, uncrosslinked polymers have a mean molar mass of >7500 g/mol, and wherein the three-dimensional network structures of high network density are obtained by reacting components that have number-average equivalent molar masses of <1500 g/mol.

2. The holographic medium according to claim 1, wherein the protective layer covers at least one surface of the photopolymer film completely.

3. The holographic medium according to claim 1, wherein the protective layer has a thickness of from 1 to 40 μm.

4. The holographic medium according to claim 1, wherein the protective layer comprises polyurethane, polychloroprene and/or acrylate polymers.

5. The holographic medium according to claim 1, wherein the protective layer is obtained by applying an aqueous or low-solvent polymer formulation to the photopolymer film.

6. The holographic medium according to claim 1, wherein the photoinitiators comprise an anionic, cationic or neutral dye and a coinitiator.

7. The holographic medium according to claim 1, wherein a hologram is exposed into the photopolymer film.

8. A method for the production of a hologram comprising exposing interferometrically the holographic medium according to claim 1 wherein in the hologram is selected from the groups consisting of in-line hologram, off-axis hologram, full-aperture transfer hologram, white light transmission hologram, Denisyuk hologram, off-axis reflection holograms, edge-lit hologram, and holographic stereogram.

9. A process for the production of a holographic medium according to claim 1 comprising preparing a photopolymer film from a formulation comprising polyisocyanates, polyols, acrylate writing monomers and photoinitiators and applying a protective layer to the photopolymer film, wherein the protective layer is impermeable to the constituents of the photopolymer film, is optically clear and is transparent to electromagnetic radiation having a wavelength in the range of from 350 to 800 nm.

10. The holographic medium according to claim 1, wherein the protective layer is the outermost layer of the holographic medium.

* * * * *